US011714538B2

(12) United States Patent
Na et al.

(10) Patent No.: US 11,714,538 B2
(45) Date of Patent: Aug. 1, 2023

(54) ELECTRONIC DEVICE, METHOD, AND COMPUTER-READABLE MEDIUM FOR SWITCHABLE BAR REGION OF USER INTERFACE

(71) Applicant: Samsung Electronics Co., Ltd., Suwon-si (KR)

(72) Inventors: Minwook Na, Suwon-si (KR); Yunsung Choi, Suwon-si (KR); Aejung Seo, Suwon-si (KR); Yong Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/426,919

(22) PCT Filed: Jan. 30, 2020

(86) PCT No.: PCT/KR2020/001396
§ 371 (c)(1),
(2) Date: Jul. 29, 2021

(87) PCT Pub. No.: WO2020/159239
PCT Pub. Date: Aug. 6, 2020

(65) Prior Publication Data
US 2022/0100337 A1 Mar. 31, 2022

(30) Foreign Application Priority Data
Jan. 31, 2019 (KR) .......................... 10-2019-0012451

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 3/0482* (2013.01); *G06F 3/0488* (2013.01);
(Continued)

(58) Field of Classification Search
CPC .. G06F 3/0482; G06F 3/04847; G06F 3/0486; G06F 3/0488; G06F 2203/04803
See application file for complete search history.

(56) References Cited

U.S. PATENT DOCUMENTS

| 5,060,170 A | 10/1991 | Bourgeois et al. |
| 7,853,899 B1 | 12/2010 | Damaschke et al. |

(Continued)

FOREIGN PATENT DOCUMENTS

| EP | 2 863 298 A1 | 4/2015 |
| KR | 10-2007-0109067 A | 11/2007 |

(Continued)

OTHER PUBLICATIONS

European Search Report dated Jan. 31, 2022, issued in European Application No. 20749160.6.

(Continued)

*Primary Examiner* — Claudia Dragoescu
(74) *Attorney, Agent, or Firm* — Jefferson IP Law, LLP

(57) ABSTRACT

At least one non-transitory computer readable storage medium is provided. The storage medium can store one or more programs including instructions which, when executed by one or more processors in an electronic device with a display, cause the electronic device to use the display to display a user interface of an application program while the application program is running, the user interface having a first height, which is higher than a reference height, and including a content region and an expanded bar region directly above the content region, receive an input for changing the first height of the user interface being dis- (Continued)

played to a second height shorter than the reference height, and use the display to switch the expanded bar region, included in the user interface of the application program, into a regular bar region having a smaller area than the area of the expanded bar region, based on receiving the input.

18 Claims, 14 Drawing Sheets

(51) Int. Cl.
    *G06F 3/0482*     (2013.01)
    *G06F 3/04847*     (2022.01)
    *G06F 3/0488*     (2022.01)
    *H04L 67/567*     (2022.01)

(52) U.S. Cl.
    CPC ........ *G06F 3/04847* (2013.01); *H04L 67/567* (2022.05); *G06F 2203/04803* (2013.01)

(56) References Cited

U.S. PATENT DOCUMENTS

| | | | | |
|---|---|---|---|---|
| 2007/0005576 | A1* | 1/2007 | Cutrell | G06F 16/90324 707/E17.14 |
| 2013/0147849 | A1 | 6/2013 | Kwak et al. | |
| 2013/0332850 | A1* | 12/2013 | Bovet | G06F 3/0482 715/752 |
| 2014/0229888 | A1* | 8/2014 | Ko | G06F 3/04886 715/783 |
| 2015/0067585 | A1 | 3/2015 | Won et al. | |
| 2015/0186610 | A1* | 7/2015 | Sansale | G16H 40/63 715/739 |
| 2016/0004406 | A1 | 1/2016 | Kang et al. | |
| 2016/0253051 | A1 | 9/2016 | Kim et al. | |
| 2017/0140504 | A1* | 5/2017 | Jeong | G06F 3/04886 |
| 2018/0321843 | A1* | 11/2018 | Giannotti | G06F 3/04845 |

FOREIGN PATENT DOCUMENTS

| | | | |
|---|---|---|---|
| KR | 10-2013-0064458 | A | 6/2013 |
| KR | 10-2014-0089714 | A | 7/2014 |
| KR | 10-2014-0136794 | A | 12/2014 |
| KR | 10-2015-0007569 | A | 1/2015 |
| KR | 10-2015-0027613 | A | 3/2015 |
| KR | 10-2016-0004590 | A | 1/2016 |
| KR | 10-2016-0104277 | A | 9/2016 |
| KR | 10-2017-0054056 | A | 5/2017 |
| WO | 2018/165437 | A1 | 9/2018 |

OTHER PUBLICATIONS

Material Design, App bars: top, https://material.io/components/app-bars-top.

* cited by examiner

ELECTRONIC DEVICE, METHOD, AND COMPUTER-READABLE MEDIUM FOR SWITCHABLE BAR REGION OF USER INTERFACE

CROSS-REFERENCE TO RELATED APPLICATION(S)

This application is a U.S. National Stage application under 35 U.S.C. § 371 of an International application number PCT/KR2020/001396, filed on Jan. 30, 2020, which is based on and claims priority of a Korean patent application number 10-2019-0012451, filed on Jan. 31, 2019, in the Korean Intellectual Property Office, the disclosure of which is incorporated by reference herein in its entirety.

TECHNICAL FIELD

The disclosure relates to an electronic device, a method, and a computer-readable medium for a bar region of a user interface which is switchable according to a situation.

BACKGROUND ART

With the development of technology, electronic devices, such as laptops, tablets, pablets, smartphone, or the like, are increasingly distributed. Such an electronic device may display a user interface of an application including a content region and a bar region while executing the application. The bar region may intuitively provide information and/or actions concerning an execution screen of the application which is displayed within the content region.

DISCLOSURE OF INVENTION

Technical Problem

A user interface displayed on a display of an electronic device that may include a content region and a switchable bar region. Since the switchable bar region is switched from a regular bar region to an expanded bar region or is switched from an expanded bar region to a regular bar region according to a situation, a configuration of the situation may be required.

The technical object to be achieved by the disclosure is not limited to that mentioned above, and other technical objects that are not mentioned above may be clearly understood to those skilled in the art based on the description provided below.

Solution to Problem

In accordance with an aspect of the disclosure, an electronic device is provided. The electronic device includes a display, a memory configured to store instructions, and at least one processor operably coupled with the memory and the display, and, when executing the instructions, the at least one processor may be configured to display a user interface of an application including a content region and an expanded bar region disposed directly above the content region, and having a first height longer than a reference height, by using the display, while executing the application, receive an input for changing the first height of the user interface being displayed to a second height which is shorter than the reference height, and, based on receiving the input, switch the expanded bar region which is included in the user interface of the application to a regular bar region which has an area smaller than an area of the expanded bar region, by using the display.

In accordance with another aspect of the disclosure, at least one non-transitory computer readable storage medium is provided. The storage medium may store one or more programs including instructions that, when being executed by one or more processors of an electronic device with a display, cause the electronic device to display a user interface of an application program including a content region and an expanded bar region disposed directly above the content region, and having a first height longer than a reference height, by using the display, while executing the application program, receive an input for changing the first height of the user interface being displayed to a second height which is shorter than the reference height, and, based on receiving the input, switch the expanded bar region which is included in the user interface of the application program to a regular bar region which has an area smaller than an area of the expanded bar region, by using the display.

In accordance with another aspect of the disclosure, a method executed in an electronic device with a display is provided. The method includes displaying a user interface of an application including a content region and an expanded bar region disposed directly above the content region, and having a first height longer than a reference height, by using the display, while executing the application within the electronic device, receiving an input for changing the first height of the user interface being displayed to a second height which is shorter than the reference height, and, based on receiving the input, switching the expanded bar region which is included in the user interface of the application to a regular bar region which has an area smaller than an area of the expanded bar region, by using the display.

Advantageous Effects of Invention

The electronic device, the method, and the computer-readable recording medium for the bar region of the user interface which is switchable according to a situation in accordance with various embodiments can provide enhanced user experience (UX).

Other aspects, advantages, and salient features of the disclosure will become apparent to those skilled in the art from the following detailed description, which, taken in conjunction with the annexed drawings, discloses various embodiments of the disclosure.

BEST MODE FOR CARRYING OUT THE INVENTION

Figure 1:
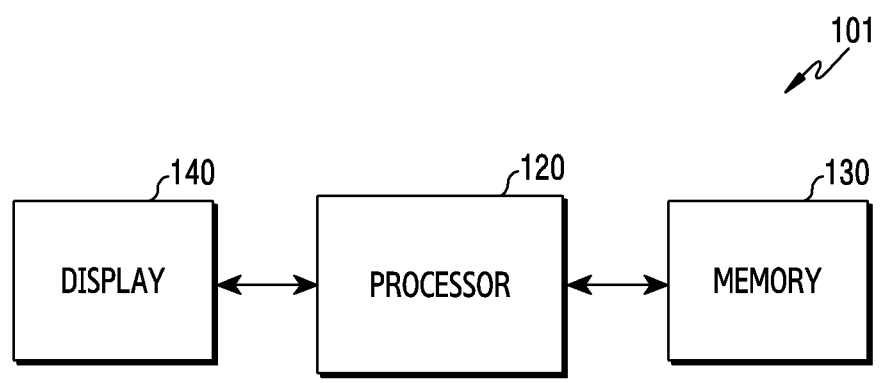
FIG. 1 is a simplified block diagram of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of various embodiments described herein can be made without departing from the scope and spirit of the disclosure. In addition, descriptions of well-known functions and constructions may be omitted for clarity and conciseness.

In the disclosure disclosed herein, the expressions "have," "may have," "include" and "comprise," or "may include" and "may comprise" used herein indicate existence of corresponding features (for example, elements, such as numeric values, functions, operations, or components) and do not preclude the presence of additional features.

In the disclosure disclosed herein, the expressions "A or B," "at least one of A or/and B," or "one or more of A or/and B," and the like may include all possible combinations of the items enumerated together. For example, "A or B," "at least one of A and B," or "at least one of A or B" may refer to all of the case (1) where at least one A is included, the case (2) where at least one B is included, or the case (3) where both of at least one A and at least one B are included.

As used herein, such terms as "1st" and "2nd," or "first" and "second" may be used to simply distinguish a corresponding component from another, and does not limit the components in other aspect (e.g., importance and/or order). For example, "a first user device" and "a second user device" indicate different user devices regardless of the order or priority. For example, without departing from the scope of the disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), the element can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element) between the element and another element.

According to the situation, the term "configured to (or set to)" used in the disclosure may be interchangeably used with the terms "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, "a processor configured (set) to perform A, B, and C" may refer, for example, and without limitation, to a dedicated processor (for example, an embedded processor) for performing a corresponding operation, or a generic-purpose processor (for example, a central processing unit (CPU) or an application processor (AP)), or the like, for performing corresponding operations by executing one or more software programs stored in a memory device.

Terms used in the disclosure are used to describe specified embodiments and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistant (PDAs), portable multimedia players (PMPs), moving picture experts group (MPEG-1 or MPEG-2) audio layer 3 (MP3) players, mobile medical devices, cameras, or wearable devices. According to various embodiments, the wearable devices may include at least one of accessories (for example, watches, rings, bracelets, ankle bracelets, necklaces, glasses, contact lenses, head-mounted-devices (HMDs), or the like), fabric- or clothing-mounted devices (for example, electronic apparels), body-mounted devices (for example, skin pads, tattoos, or the like), or bio-implantable circuits.

According to some embodiments of the disclosure, the electronic devices may be home appliances. The home appliances include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™, Apple TV™, or Google TV™), game consoles (for example, Xbox™ and PlayStation™), electronic dictionaries, electronic keys, camcorders, or electronic picture frames.

According to another embodiment of the disclosure, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or Internet of things (for example, light bulbs, various sensors, electricity or gas meters, sprinkler devices, fire alarms, thermostats, street lamps, toasters, exercise equipment, hot water tanks, heaters, boilers, or the like).

According to an embodiment of the disclosure, the electronic devices may include at least one of furniture, a part of buildings/structures, electronic boards, electronic signature receiving devices, projectors, or various measuring instruments (for example, water meters, electricity meters, gas meters, or wave meters). In various embodiments of the disclosure, the electronic devices may be one or a combination of two or more devices of the above-mentioned devices. According to a certain embodiment of the disclosure, the electronic device may be a flexible electronic device or a foldable electronic device. In addition, the electronic devices according to various embodiments of the disclosure are not limited to the above-mentioned devices, and may include new electronic devices according to technology development.

In the disclosure, the term "user" may refer to a person who uses the electronic device or a device that uses the electronic device (for example, an artificial intelligence electronic device).

Hereinafter, various embodiments will be described in detail with reference to the accompanying drawings. However, dimensions of elements in the drawings may be exaggerated or reduced for convenience of explanation. For example, sizes and thicknesses of respective elements shown in the drawings are arbitrarily illustrated for convenience of explanation, and thus the disclosure should not be limited to the illustrations of the drawings.

FIG. 1 is a simplified block diagram of an electronic device according to an embodiment of the disclosure.

Figure 2:
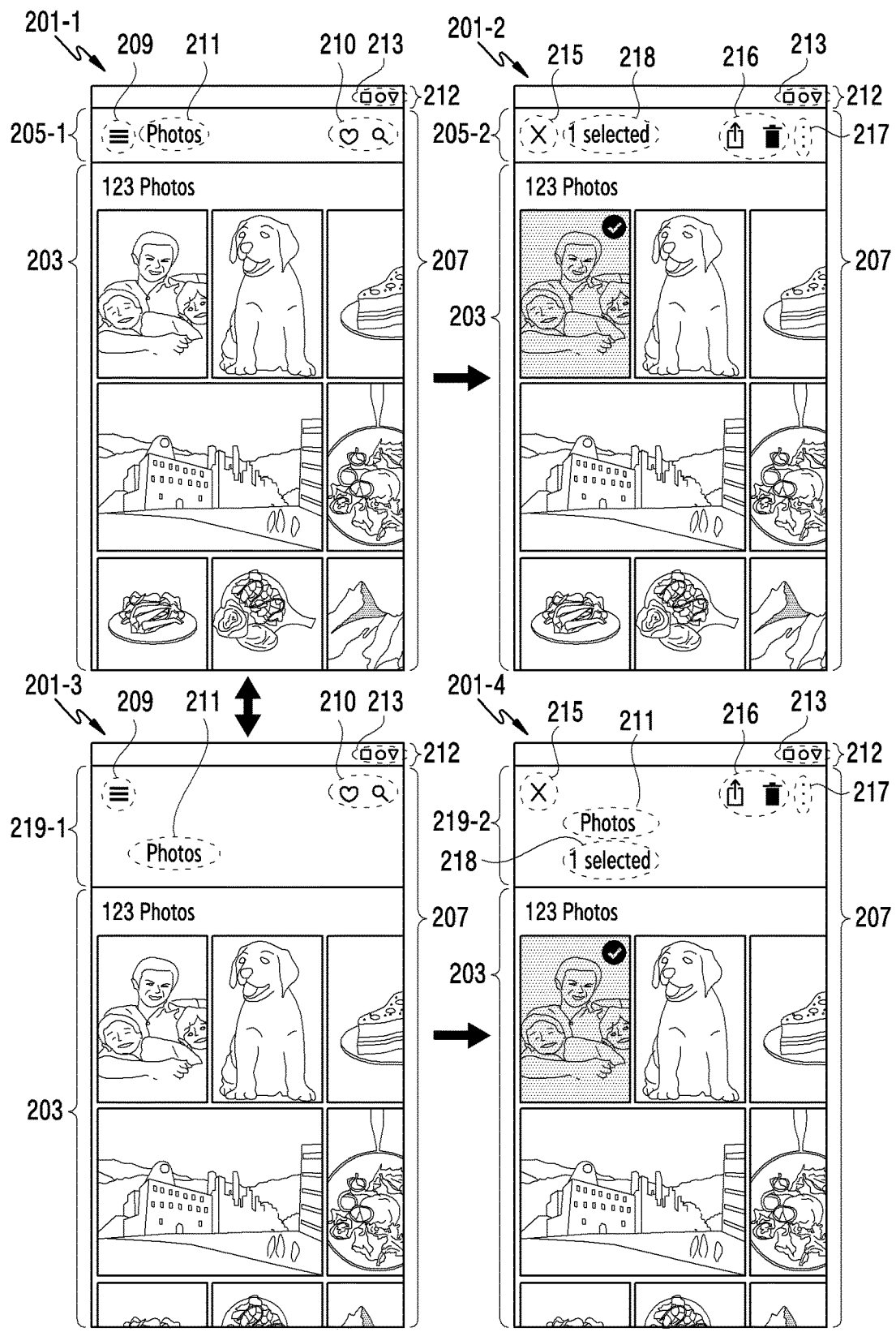
FIG. 2 is a view illustrating a bar region of a user interface displayed within an electronic device according to an embodiment of the disclosure.

FIG. 2 illustrates a bar region of a user interface displayed within an electronic device according to an embodiment of the disclosure.

Figure 3:
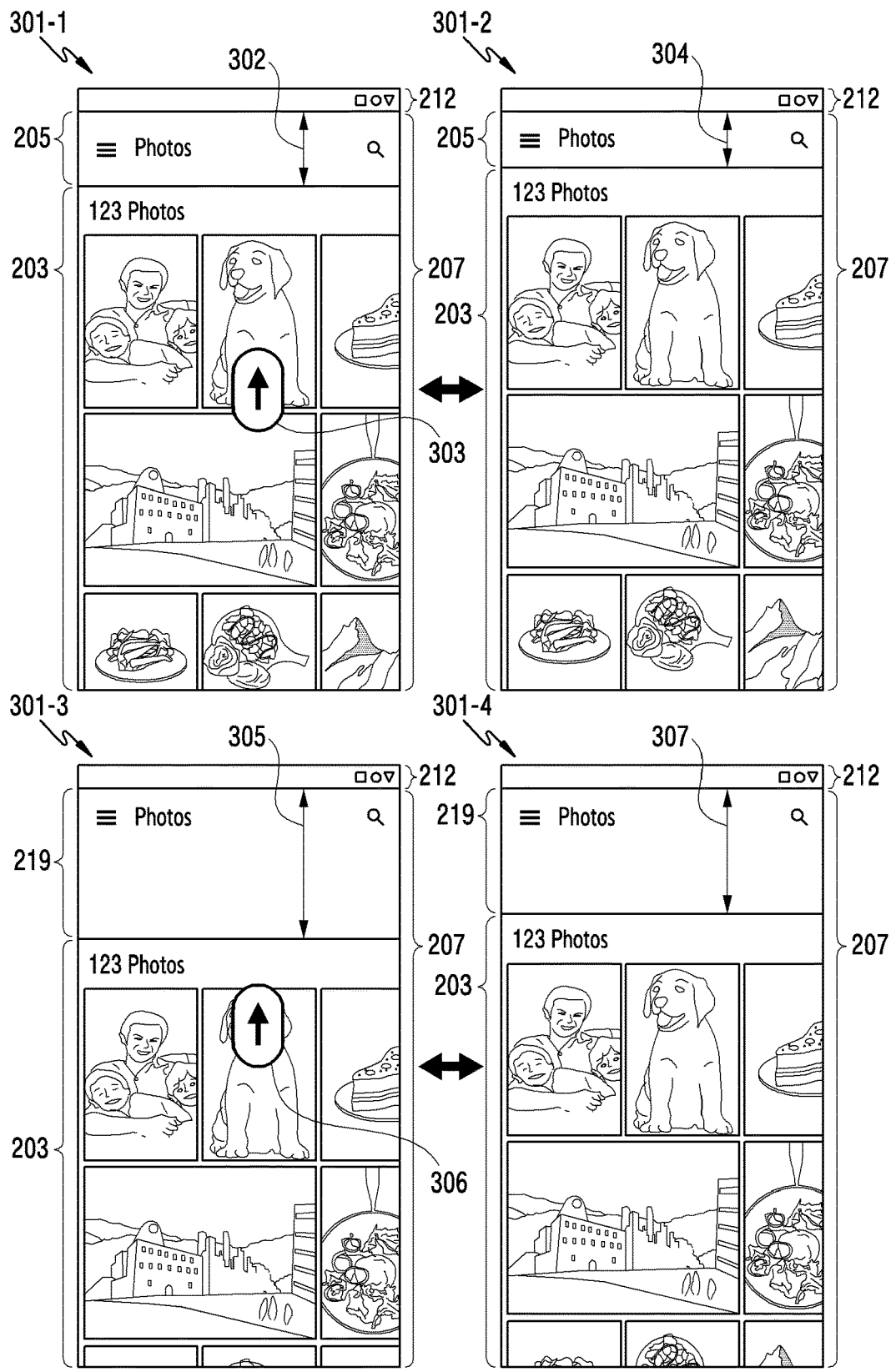
FIG. 3 is a view illustrating a regular bar region and an expanded bar region of a user interface displayed within an electronic device according to an embodiment of the disclosure.

FIG. 3 illustrates a regular bar region and an expanded bar region of a user interface displayed within an electronic device according to an embodiment of the disclosure.

Figure 4:
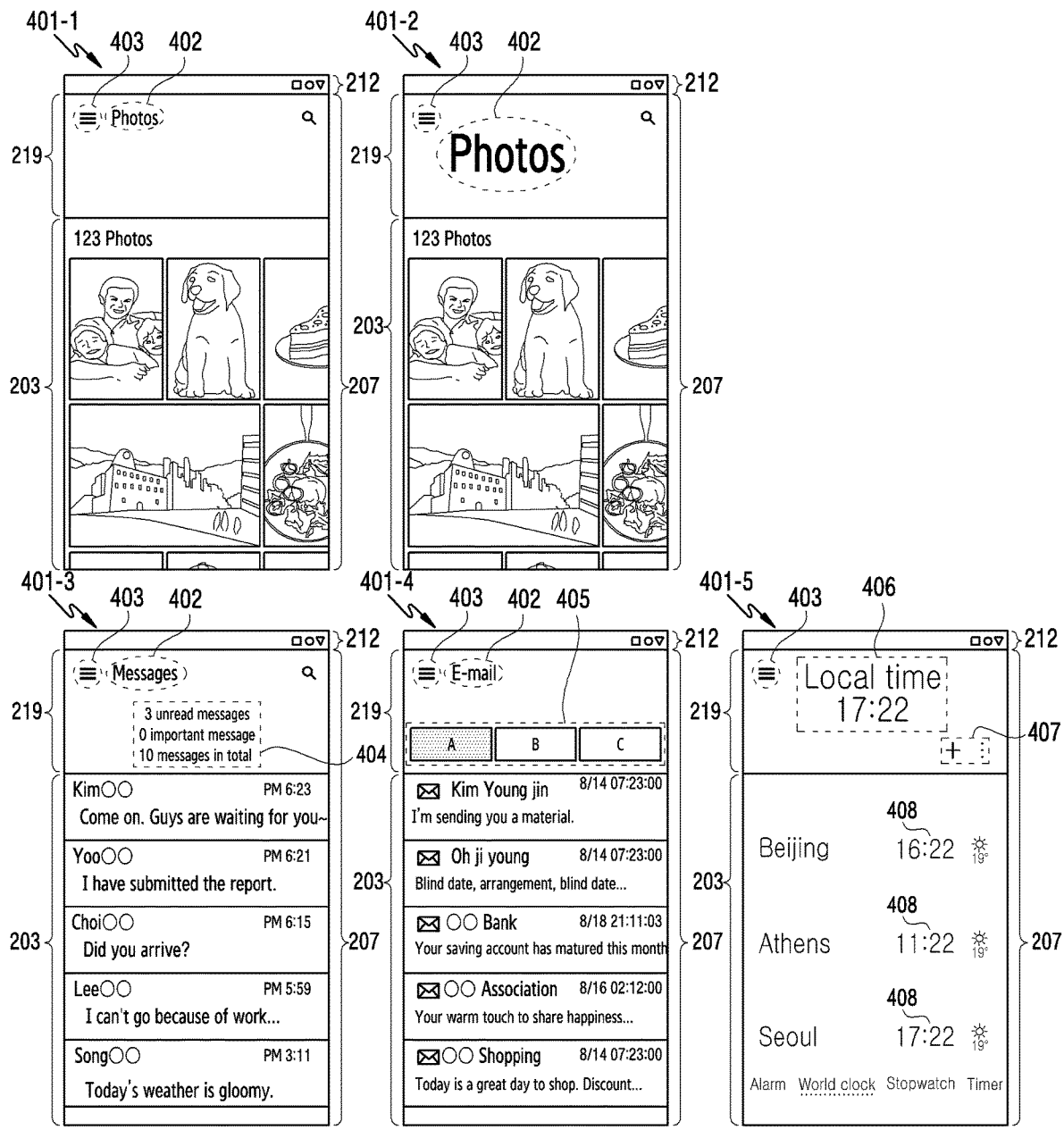
FIG. 4 is a view illustrating expanded bar regions of a user interface displayed within an electronic device according to an embodiment of the disclosure.

FIG. 4 illustrates expanded bar regions of a user interface displayed within an electronic device according to an embodiment of the disclosure.

Figure 5:
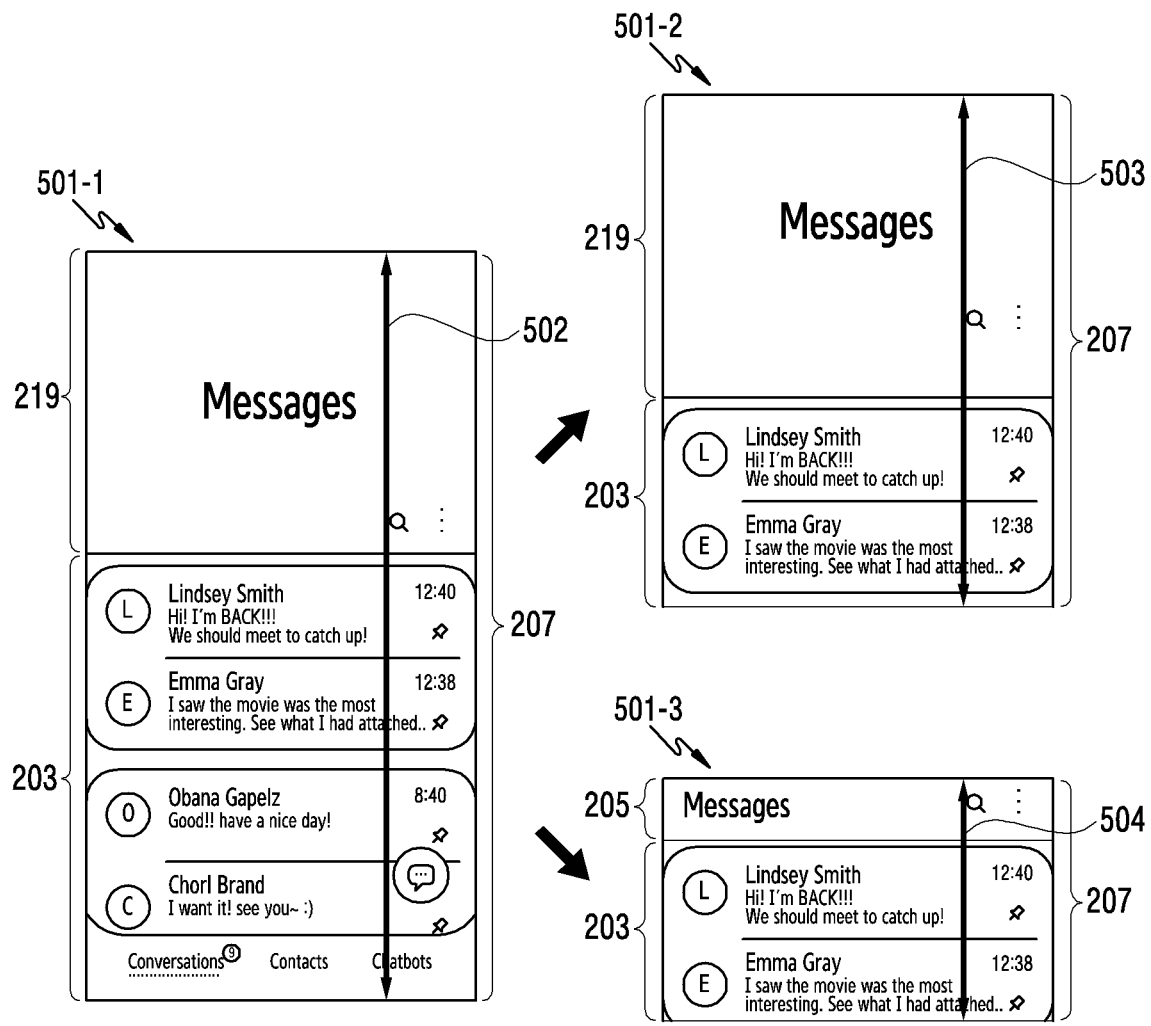
FIG. 5 is a view illustrating switching or maintaining a bar region according to an embodiment of the disclosure.

FIG. 5 illustrates switching or maintaining a bar region according to an embodiment of the disclosure.

Figure 6:
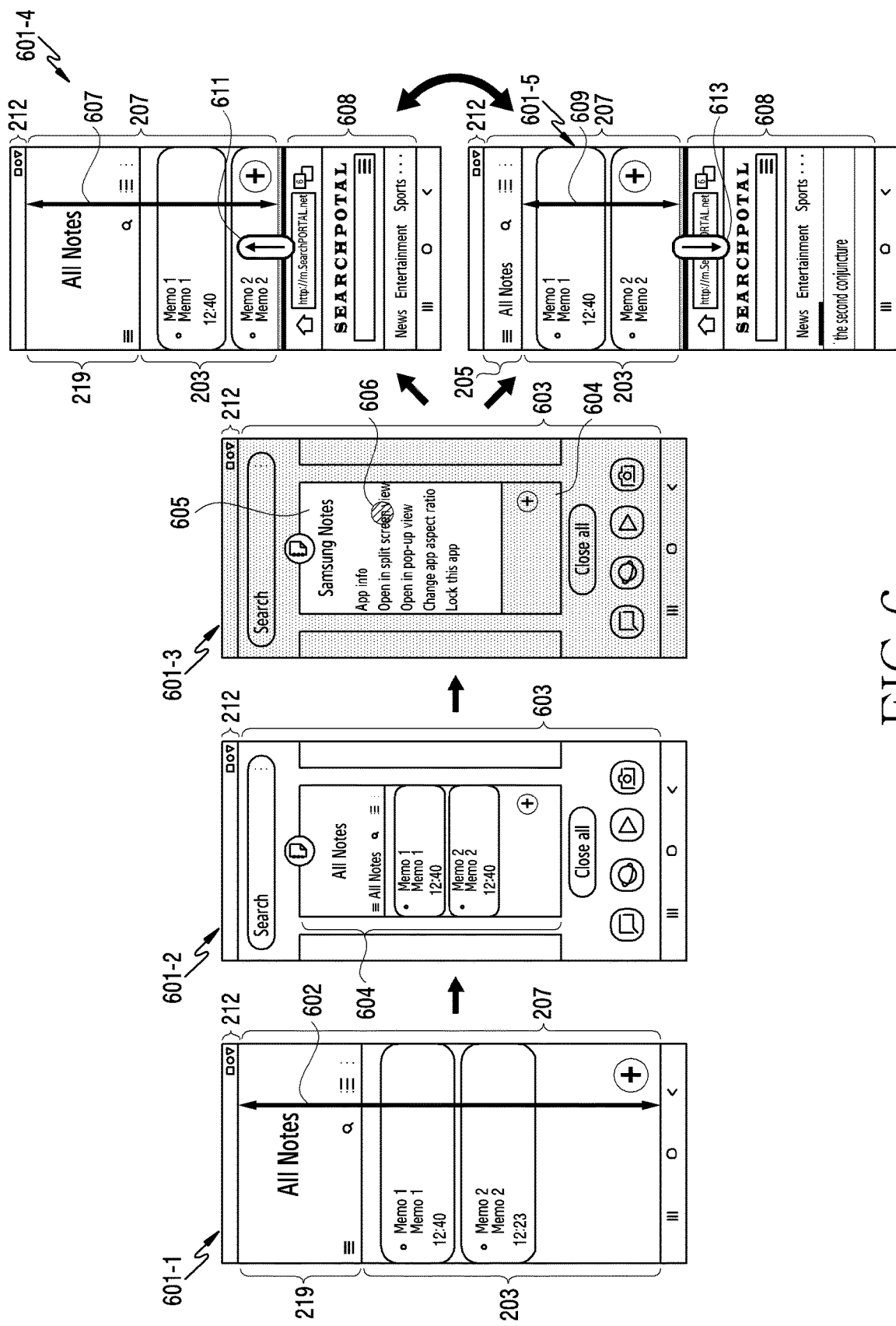
FIG. 6 is a view illustrating switching or maintaining a bar region in response to switching a display mode of a user interface to a split screen mode according to an embodiment of the disclosure.

FIG. 6 illustrates switching or maintaining a bar region in response to switching a display mode of a user interface to a split screen mode according to an embodiment of the disclosure.

Figure 7:
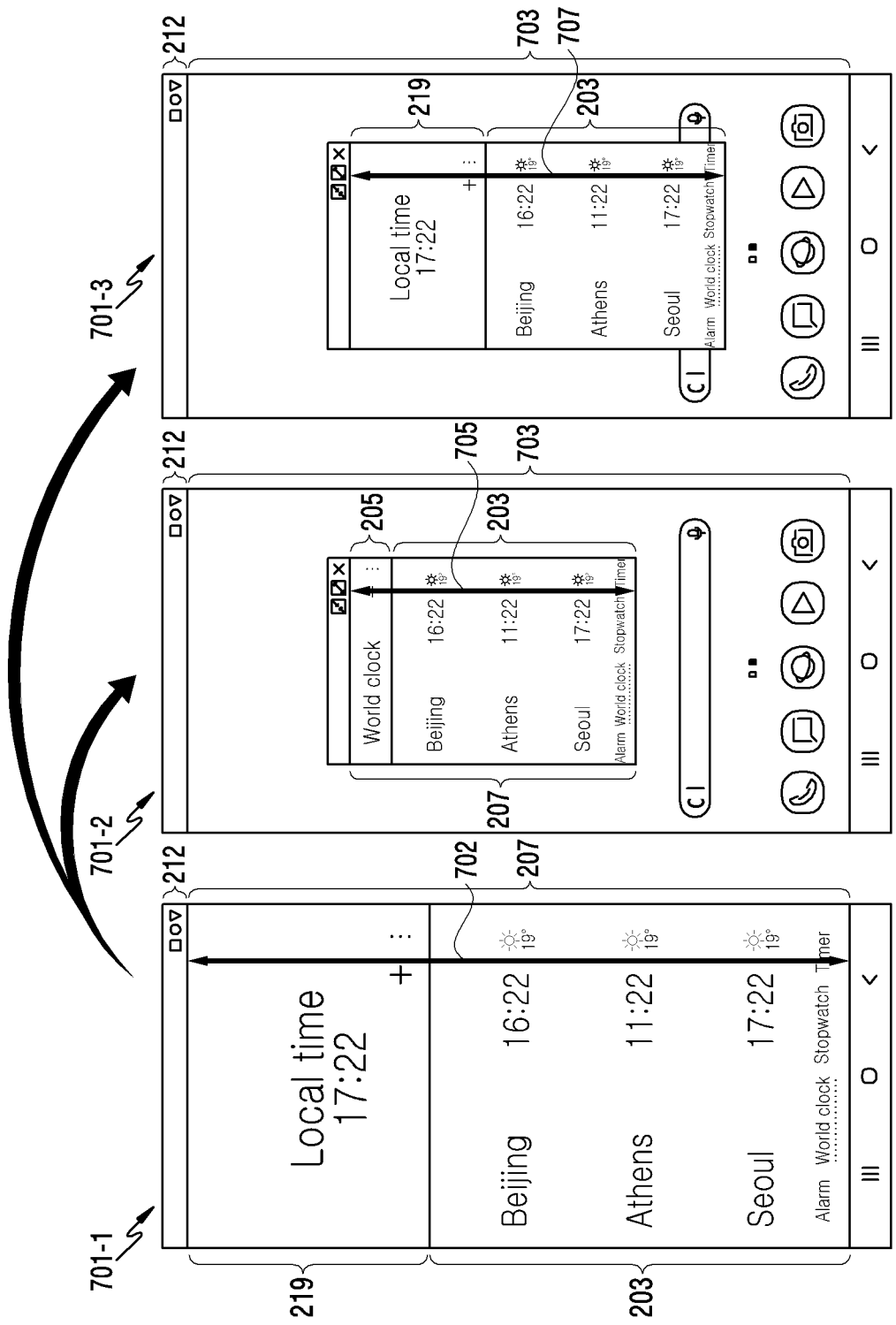
FIG. 7 is a view illustrating switching or maintaining a bar region in response to switching a display mode of a user interface to a pop-up screen mode according to an embodiment of the disclosure.

FIG. 7 illustrates switching or maintaining a bar region in response to switching a display mode of a user interface to a pop-up screen mode according to an embodiment of the disclosure.

Figure 8:
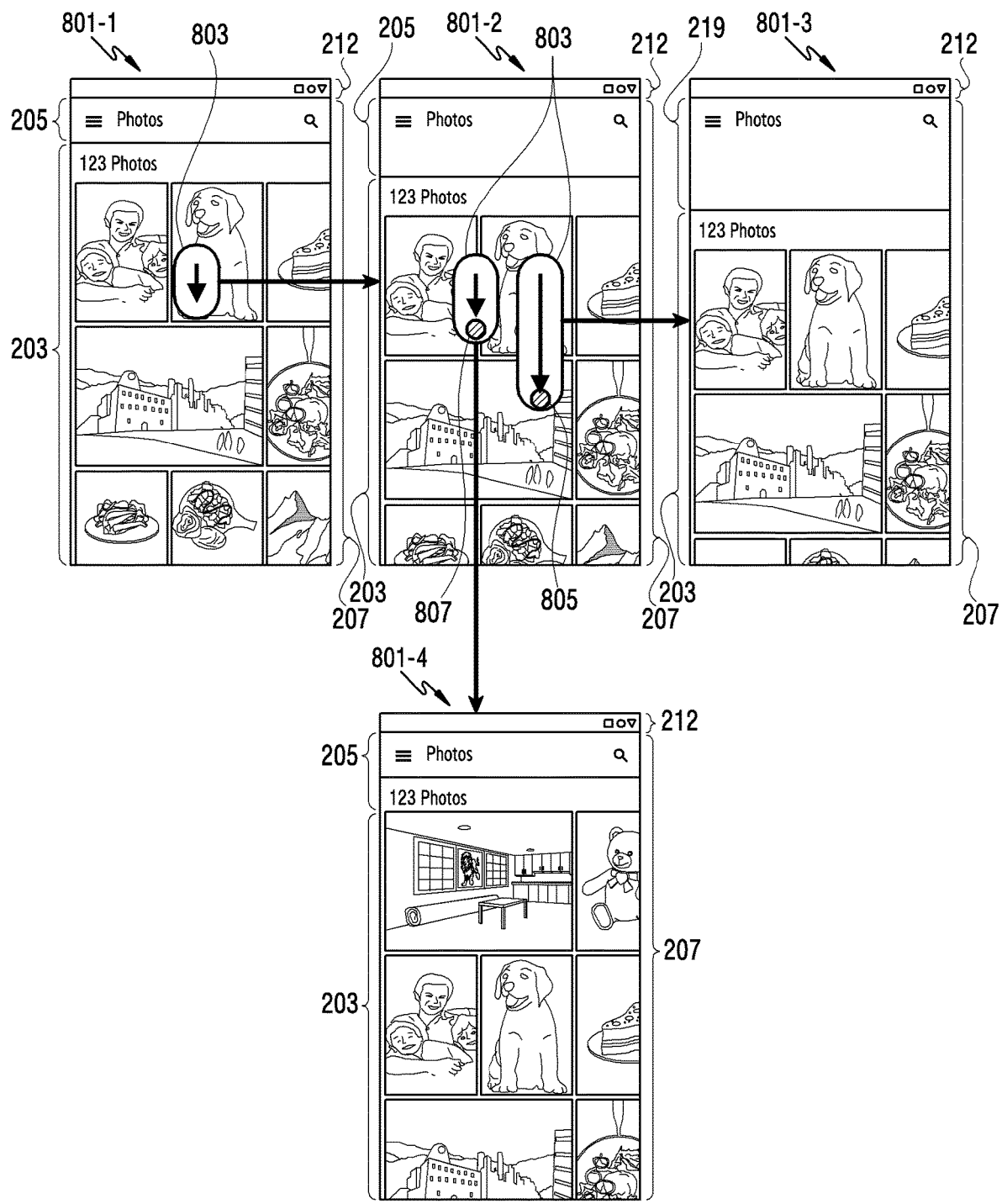
FIG. 8 is a view illustrating maintaining or switching a regular bar region based on a drag gesture according to an embodiment of the disclosure.

FIG. 8 illustrates maintaining or switching a regular bar region based on a drag gesture according to an embodiment of the disclosure.

Figure 9:
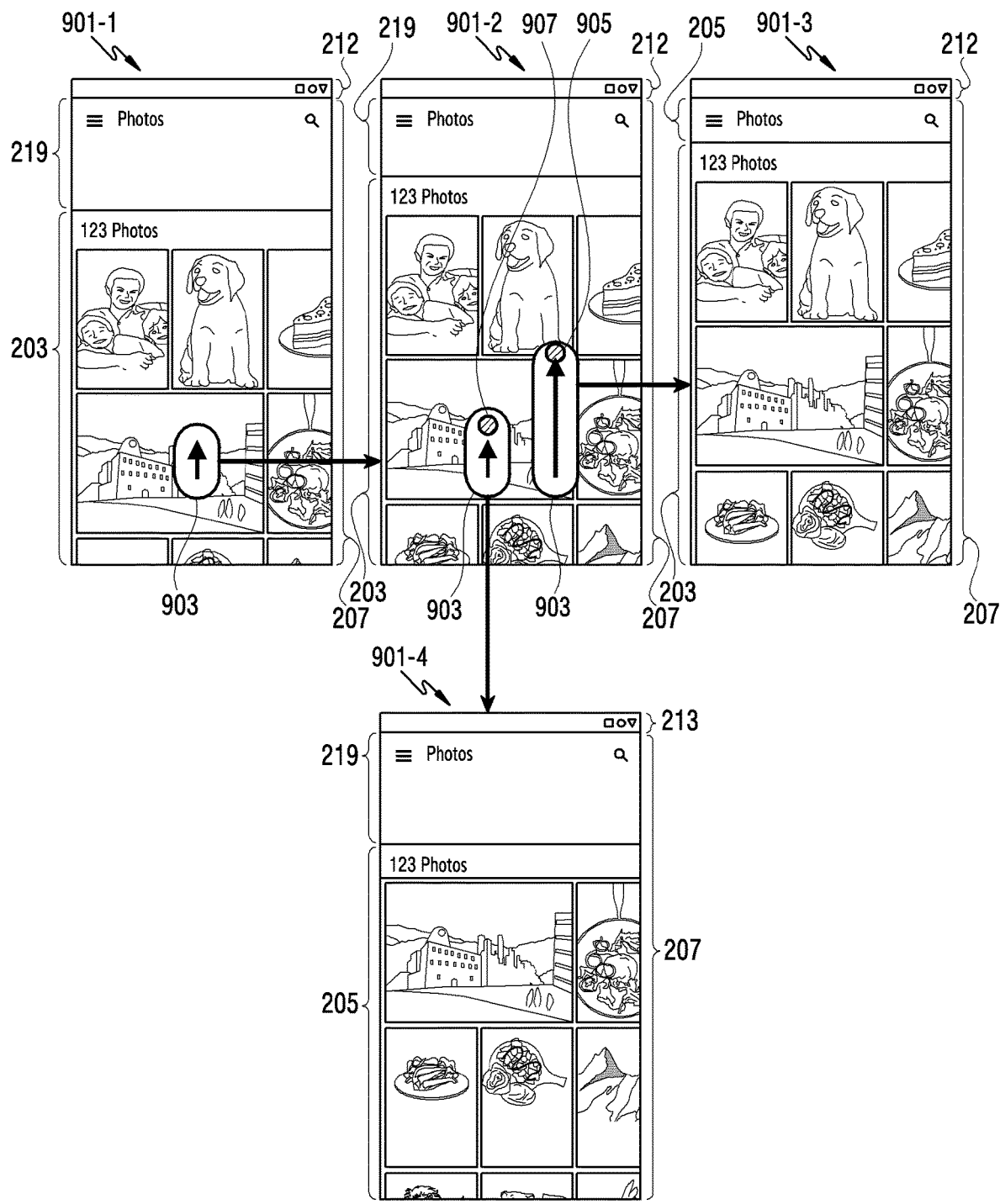
FIG. 9 is a view illustrating maintaining or switching an expanded bar region based on a drag gesture according to an embodiment of the disclosure.

FIG. 9 illustrates maintaining or switching an expanded bar region based on a drag gesture according to an embodiment of the disclosure.

Referring to FIG. 1, the electronic device 101 may include a processor 120, a memory 130, and a display 140.

The processor 120 may control overall operations of the electronic device 101. For example, the processor 120 may execute applications which provide a message, an alarm, a photo, an advertisement, Internet, a game, a video, or the like. In various embodiments of the disclosure, the processor 120 may include a single processor core or a plurality of processor cores. For example, the processor 120 may include a multi-core, such as a dual-core, a quad-core, a hexa-core, or the like. According to embodiments of the disclosure, the processor 120 may further include a cache memory positioned inside or outside the processor.

The processor 120 may receive commands of other components of the electronic device 101, and may interpret a received command and may perform computation or process data according to the interpreted command.

The processor 120 may process data or a signal which is generated or occurs in an application. For example, the processor 120 may request an instruction, data or a signal from the memory 130 to execute or control an application. The processor 120 may record (or store) or refine an instruction, data, or a signal on the memory 130 to execute or control an application.

The processor 120 may interpret and process a message, data, an instruction, or a signal received from the memory 130 or the display 140. The processor 120 may generate a new message, data, instruction, or signal based on the received message, data, instruction or signal. The processor 120 may provide the processed or generated message, data, instruction or signal to the memory 130 or the display 140.

An entirety or a part of the processor 120 may be electrically or operably or operatively coupled with or connected to another component (for example, the memory 130 or the display 140) within the electronic device 101.

According to embodiments of the disclosure, the processor 120 may be configured with one or more processors. For example, the processor 120 may include one or more of an application processor (AP) for controlling a program of an upper layer, such as an application program (referred to as an application in the disclosure), or a graphic processing unit (GPU) for controlling the display 140.

The memory 130 may store an instruction, a control command code, control data, or user data for controlling the electronic device 101. For example, the memory 130 may include an application, an operating system (OS), middleware, a device driver.

The memory 130 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 130 may include a non-volatile medium, such as a hard disk drive (HDD), a solid-state disk (SSD), an embedded multi-media card (eMMC), a universal flash storage (UFS).

The display 140 may output a content, data, or a signal. In various embodiments of the disclosure, the display 140 may display image data which is processed by the processor 120.

According to various embodiments of the disclosure, the display 140 may be configured with an integrated touch screen by being coupled with a plurality of touch sensors (not shown) for receiving a touch input, or the like. When the display 140 is configured with the touch screen, the plurality of touch sensors may be disposed above the display 140, below the display 140, or within the display 140.

According to various embodiments of the disclosure, the display 140 may be configured with a display (for example, a foldable display) having at least a part of the display 140 folded. When the display 140 is configured with the foldable display, the electronic device 101 may have a structure capable of folding the display 140.

In various embodiments of the disclosure, the processor 120 may display a user interface (UI) of an application in response to executing the application installed in the electronic device 101. In various embodiments of the disclosure, the user interface may include a content region and a bar region.

In various embodiments of the disclosure, the content region may provide an execution screen of the application. For example, when the application is a message application, the content region may provide one or more of a list including messages transmitted from the electronic device 101 or a list including messages received at the electronic device 101. In another example, when the application is a gallery application, the content region may provide at least some of thumbnail images for representing at least some of images stored in the electronic device 101 or a server (for example, a cloud server) interlocking with the electronic device 101. In still another example, when the application is an alarm application, the content region may provide information concerning one or more alarms currently set in the electronic device 101. In yet another example, when the application is a contacts application, the content region may provide a list including contacts registered in the electronic device 101. In various embodiments of the disclosure, a size of the content region may be larger than a size of the bar region. In various embodiments of the disclosure, the content region may be referred to as a main display area of the user interface in the sense that it provides the execution screen of the application or has a size larger than the bar region.

In various embodiments of the disclosure, the bar region may provide information concerning the execution screen of the application which is provided within the content region, or action items concerning the execution screen of the application.

For example, the information concerning the execution screen may include information concerning a representative content from among a plurality of contents included in the execution screen. For example, the information concerning the execution screen may include information concerning a title of the application which provides the execution screen. For example, the information concerning the execution screen may include summary information concerning the execution screen. For example, the information concerning the execution screen may include statistical information concerning the execution screen. For example, the information concerning the execution screen may include information concerning a state (for example, a current section) of the execution screen. However, this should not be considered as limiting. In various embodiments of the disclosure, the information concerning the execution screen may be configured with at least one non-executable object. In various embodiments of the disclosure, the information concerning the execution screen may be configured with at least one text.

For example, the action items may include an executable object for invoking a menu to be provided through the execution screen of the application. For example, the action items may include an executable object for controlling the execution screen of the application. For example, the action items may include an executable object for transferring the execution screen of the application or at least one content included in the execution screen of the application to another application. For example, the action items may include an executable object for adding the execution screen of the application to favorites. However, this should not be considered as limiting.

In various embodiments of the disclosure, the bar region may be positioned directly above the content region or directly below the content region.

In various embodiments of the disclosure, the bar region may be a switchable bar region. For example, the bar region may be switched from a regular bar region having a first size to an expanded bar region having a second size larger than the first size, or may be switched from the expanded bar region to the regular bar region. For example, the bar region may be switched from a regular bar region having a designated height to an expanded bar region having another designated height which is longer than the designated height, or may be switched from the expanded bar region to the regular bar region. In various embodiments of the disclosure, the expanded bar region may have a size larger than the regular bar region or may have a larger area that the regular bar region. The expanded bar region may be referred to as a prominent bar region in the sense that it has a size larger than the regular bar region or it has higher visibility than the regular bar region. In various embodiments of the disclosure, a font size of a text included in the expanded bar region may be larger than a font size of a text included in the regular bar region. In various embodiments of the disclosure, at least one non-executable object and at least one executable object which are included in the regular bar region may be displayed in a single row, whereas at least one non-executable object and at least one executable object which are included in the expanded bar region may be displayed in multiple rows. In various embodiments of the disclosure, the expanded bar region may include more pieces of information than information included in the regular bar region. For example, the regular bar region may include only title information of the application, whereas the expanded bar region may include not only the title information of the application but also summary information of the execution screen of the application displayed within the content region. In other words, the expanded bar region may further include summary information of the execution screen, compared to the regular bar region. In another example, compared to the regular bar region, the expanded bar region may further include at least one executable object for classifying the plurality of classifiable contents included in the execution screen of the application, which is displayed within the content region, according to at least one classification criterion. In still another example, compared to the regular bar region, the expanded bar region may further include information concerning a content having a highest priority from among the plurality of contents included in the execution screen of the application, which is displayed within the content region. However, this should not be considered as limiting.

In various embodiments of the disclosure, the processor 120 may switch the bar region from the regular bar region or may switch the expanded bar region to the regular bar region according to a situation. In various embodiments of the disclosure, the processor 120 may switch the bar region from the regular bar region of a first state to a regular bar region of a second state, or may switch the regular bar region of the second state to the regular bar region of the first state, according to a situation. In various embodiments of the disclosure, the processor 120 may switch the bar region from the expanded bar region of the first state to the expanded bar region of the second state, or may switch from the expanded bar region of the second state to the expanded bar region of the first state.

For example, referring to FIG. 2, as in a situation 201-1, the processor 120 may display a user interface 207 of an application (for example, a gallery application) including a content region 203 and a regular bar region 205-1 of a first state by using the display 140. In various embodiments of the disclosure, the regular bar region 205-1 of the first state may include an executable object 209 for invoking a menu which is provided through an execution screen of the application displayed within the content region 203, an executable object 210 for controlling the execution screen of the application displayed within the content region 203, and a non-executable object 211 including title information of the application. However, this should not be considered as limiting. In various embodiments of the disclosure, the user interface 207 may be displayed directly below an indicator region 212. In various embodiments of the disclosure, the indicator region 212 may be used to indicate a state of the electronic device 101. For example, the indicator region 212 may include indicators 213 for indicating a state of the electronic device 101 (for example, an antenna indicator for indicating communication quality that the electronic device 101 can currently provide, a battery indicator for indicating a remaining capacity of a rechargeable battery of the electronic device 101, a lock indicator for indicating whether the electronic device 101 is in a lock state or unlock state, or the like). According to various embodiments of the disclosure, the processor 120 may display the user interface 207 without displaying the indicator region 212.

In various embodiments of the disclosure, the processor 120 may switch the regular bar region 205-1 of the first state to a regular bar region 205-2 of a second state, in response to receiving a designated input while displaying the user interface 207 including the regular bar region 205-1 of the first state. For example, as in a situation 201-2, the processor 120 may switch the regular bar region 205-1 of the first state to the regular bar region 205-2 of the second state, in response to receiving an input for selecting at least one of a plurality of thumbnail images included in the execution screen displayed within the content region 203 while displaying the user interface 207 including the regular bar region 205-1 of the first state. In various embodiments of the disclosure, the regular bar region 205-2 of the second state may include action items concerning the at least one selected thumbnail image. For example, the regular bar region 205-2 of the second state may include an executable object 215 for canceling selection of the at least one thumbnail image, executable objects 216 for determining at least one image processing method corresponding to the at least one selected thumbnail image, an executable object 217 for invoking at least one executable object for providing a function which is distinct from the executable object 215 and the executable object 216, and a non-executable object for indicating the number of the at least one selected thumbnail image. The regular bar region 205-2 of the second state may be referred to as a contextual action regular bar region in the sense that it is displayed depending on reception of an input.

In various embodiments of the disclosure, as in a situation 201-3, the processor 120 may switch the regular bar region 205-1 of the first state to an expanded bar region 219-1 of the first state, in response to receiving a designated input while displaying the user interface 207 including the regular bar region 205-1 of the first state. In various embodiments of the disclosure, the expanded bar region 219-1 of the first state may include the executable object 209, the executable objects 210, and the non-executable object 211. In various embodiments of the disclosure, arrangements of the objects included in the expanded bar region 219-1 of the first state (for example, the executable object 209, the executable objects 210, and the non-executable object 211) may be distinct from arrangements of the objects included in the regular bar region 205-1 of the first state (for example, the executable object 209, the executable objects 210, and the non-executable object 211). For example, since the expanded bar region 219-1 of the first state has a larger area than the regular bar region 205-1 of the first state, the objects arranged within the expanded bar region 219-1 of the first state may be displayed in multiple rows, differently from the objects arranged within the regular bar region 205-1 of the first state. However, this should not be considered as limiting. In various embodiments of the disclosure, when the size of the user interface 207 including the regular bar region 205-1 of the first state is the same as the size of the user interface 207 including the expanded bar region 219-1 of the first state, a size of the content region 203 included in the user interface 207 including the expanded bar region 219-1 of the first state may be smaller than a size of the content region 203 included in the user interface 207 including the regular bar region 205-1 of the first state. For example, when the size of the user interface 207 including the regular bar region 205-1 of the first state is the same as the size of the user interface 207 including the expanded bar region 219-1 of the first state, the content region 203 included in the user interface 207 including the expanded bar region 219-1 of the first state may provide the execution screen from a location close to user's hand gripping the electronic device 101, due to the difference in size between the expanded bar region 219-1 of the first state and the regular bar region 205-1 of the first state. For example, a user using the electronic device 101 which displays the user interface 107 including the expanded bar region 219-1 of the first state can more easily manipulate the execution screen displayed within the content region 203 by using one hand.

In various embodiments of the disclosure, the processor 120 may switch the expanded bar region 219-1 of the first state to the expanded bar region 219-1 of the second state, in response to receiving a designated input while displaying the user interface 207 including the expanded bar region 219-1 of the first state. For example, as in a situation 201-4, the processor 120 may switch the expanded bar region 219-1 of the first state to the expanded bar region 219-2 of the second state, in response to receiving an input for selecting at least one thumbnail image from among the plurality of thumbnail images included within the execution screen displayed within the content region 203 while displaying the user interface 207 including the expanded bar region 219-1 of the first state. In various embodiments of the disclosure, the expanded bar region 219-2 of the second state may include action items concerning the at least one selected thumbnail image. For example, the expanded bar region 219-2 of the second state may include the executable object 215, the executable objects 216, the executable object 217, and the non-executable object 218. The expanded bar region 219-2 of the second state may be referred to as a contextual action expanded bar region in the sense that it is displayed depending on reception of an input.

In various embodiments of the disclosure, the processor 120 may change the size of the regular bar region or the expanded bar region according to a situation. For example, in various embodiments of the disclosure, the processor 120 may change the size of the regular bar region while receiving an input. For example, the processor 120 may change the size of the expanded bar region while receiving an input.

For example, referring to FIG. 3, as in a situation 301-1, the processor 120 may display a user interface 207 of a gallery application, which includes a content region 203 and a regular bar region 205 having a first height 302, along with an indicator region 212. For example, as in a situation 301-2, the processor 120 may change the height of the regular bar region 205 included in the user interface 207 from the first height 302 to a second height 304 shorter than the first height 302, in response to identifying that reception of a drag input 302 is initiated while displaying the user interface 207 of the gallery application including the content region 203 and the regular bar region 205 having the first height 302 along with the indicator region 212. The regular bar region 205 having the second height 304 may be referred to as a dense regular bar region in the sense that it has a smaller area than the regular bar region 205 having the first height 302. In various embodiments of the disclosure, the second height 304 of the regular bar region 205 may be maintained while the drag input 302 is being maintained. In various embodiments of the disclosure, the height of the regular bar region 205 may be restored to the first height 302 in response to release of the drag input 302 being detected. However, this should not be considered as limiting.

In another example, referring to FIG. 3, as in a situation 301-3, the processor 120 may display the user interface 207 of the gallery application, which includes the content region 203 and an expanded bar region 219 having a third height 305, along with the indicator region 212. For example, as in a situation 301-3, the processor 120 may change the height of the expanded bar region 219 included in the user interface 207 from the third height 305 to a fourth height 307 shorter than the third height 302, in response to identifying that reception of a drag input 306 is initiated while displaying the user interface 207 of the gallery application including the content region 203 and the expanded bar region 219 having the third height 305 along with the indicator region 212. The expanded bar region 219 having the fourth height 307 may be referred to as a dense expanded bar region in the sense that it has a smaller area than the expanded bar region 219 having the third height 305. In various embodiments of the disclosure, the fourth height 307 of the expanded bar region 219 may be maintained while the drag input 306 is being maintained. In various embodiments of the disclosure, the height of the expanded bar region 205 may be restored to the third height 305 in response to release of the drag input 306 being detected. However, this should not be considered as limiting.

In various embodiments of the disclosure, the expanded bar region included in the user interface may provide a variety of information according to a situation. For example, the expanded bar region included in the user interface may provide a variety of information according to at least one of a type of a running application, a type of a content in an execution screen displayed within the content region included in the user interface, or a state of the execution screen displayed within the content region included in the user interface.

For example, referring to FIG. 4, as in a situation 401-1, the expanded bar region 219 may include a non-executable object 402 including title information of the application which provides the user interface, and an executable object 403 for invoking a menu that can be provided through the execution screen displayed within the content region of the user interface. In the situation 401-1, the non-executable object 402 and the executable object 403 may be displayed in a single row.

In another example, as in a situation 401-2, the expanded bar region 219 may display the non-executable object 402 and the executable object 403 in a plurality of rows. For example, the executable object 403 included in the expanded bar region 219 may be displayed in another row that is distinct from a row in which the non-executable object 402 included in the expanded bar region 219 is displayed. In various embodiments of the disclosure, a font size of a text constituting the non-executable object 402 may be larger than a font size of a text constituting the non-executable object included in the regular bar region.

In still another example, as in a situation 401-3, the expanded bar region 219 may include a non-executable object 404 including statistical information of the execution screen displayed within the content region of the user interface, in addition to the non-executable object 402 and the executable object 403. For example, when the user interface is a user interface that is provided by a message application, the non-executable object 404 may include statistical information indicating that there are X unread messages, there are Y important messages, and the total number of messages is Z.

In yet another example, as in a situation 401-4, the expanded bar region 219 may include at least one executable object 405 for a criterion for classifying a plurality of classifiable contents included in the content region 203 of the user interface 207, in addition to the non-executable object 402 and the executable object 403. For example, the at least one executable object 405 may include an executable object for classifying emails based on a criterion A, an executable object for classifying emails based on a criterion B, and an executable object for classifying emails based on a criterion C.

In further example, as in a situation 401-5, the expanded bar region 219 may include a non-executable object 406 including information concerning a content having a highest priority from among a plurality of contents included in the content region 203 of the user interface 207, and executable objects 407 for controlling the plurality of contents included in the content region 203 of the user interface 207, in addition to the executable object 403. For example, the non-executable object 406 may correspond to a visual object (for example, the local time zone of Seoul) indicating a local time of a region where the electronic device 101 is currently located, from among the plurality of contents (for example, visual objects 408 indicating local times of cities) included in the content region 203. For example, the executable objects 407 may further include an executable object for adding a local time or an executable object for invoking a menu regarding other functions that can be supported by the application providing the user interface 207.

In various embodiments of the disclosure, the processor 120 may provide the bar region as the regular bar region or may provide the bar region as the expanded bar region, according to a size of the user interface including the content region and the bar region. In various embodiments of the disclosure, the processor 120 may provide the bar region as the regular bar region or may provide the bar region as the expanded bar region, according to a height of the user interface including the content region and the bar region. For example, the processor 120 may detect an event of changing the size of the user interface including the expanded bar region or changing the height of the user interface including the expanded bar region. In response to detecting the event, the processor 120 may identify the height to be changed in order to determine whether to switch the expanded bar region to the regular bar region. For example, while identifying the height to be changed, the processor 120 may identify whether the height to be changed is longer than a reference height, and, based on identifying that the height to be changed is longer than the reference height, the processor 120 may maintain the expanded bar region, and, based on identifying that the height to be changed is shorter than the reference height, the processor 120 may switch the expanded bar region to the regular bar region. In various embodiments of the disclosure, the reference height is a criterion for determining whether to provide the expanded bar region or the regular bar region, and may be configured within the electronic device 101.

For example, referring to FIG. 5, as in a situation 501-1, the processor 120 may display a user interface 207 including an expanded bar region 219 and a content region 203. In various embodiments of the disclosure, the user interface 207 including the expanded bar region 219 and the content region 203 may have a first height 502 which is longer than the reference height. The processor 120 may receive an input for changing the first height 502 to another height while displaying the user interface 207 including the expanded bar region 219 and the content region 203 and having the first height 502. For example, the input may be an input for executing another application, which is distinct from the application providing the user interface 207, along with the application. For example, the input may be an input for switching a display mode of the user interface 207 from a full screen mode to a pop-up screen mode. However, this should not be considered as limiting.

In response to receiving the input, the processor 120 may identify whether the another height is longer than the reference height. For example, when the another height is a second height 503 that is longer than the reference height, the processor 120 may maintain the expanded bar region 219 included in the user interface 207 as in a situation 501-2. For example, the processor 120 may maintain the expanded bar region 219 independently of reduction of the height of the user interface 207. In another example, when the another height is a third height 504 that is shorter than or equal to the reference height, the processor 120 may switch the expanded bar region 219 included in the user interface 207 to a regular bar region 205 which has a smaller area than the area of the expanded bar region 219, as in a situation 501-3. For example, the processor 120 may switch the expanded bar region 219 to the regular bar region 215 dependently on reduction of the height of the user interface 207.

In various embodiments of the disclosure, the processor 120 may switch the expanded bar region to the regular bar region or may maintain the expanded bar region, based on an input for switching the display mode of the user interface including the expanded bar region from the full screen mode to a split screen mode. For example, referring to FIG. 6, as in a situation 601-1, the processor 120 may display a user interface 207 including an expanded bar region 219 and a content region 203, along with an indicator region 212. The user interface 207 may have a first height 602 which is longer than the reference height in the situation 601-1. The processor 120 may receive an input for invoking information concerning running applications while displaying the user interface 207 having the first height 602. In response to the input for invoking the information concerning the running applications, the processor 120 may switch the user interface 207 of the full screen mode to a user interface 603 which includes at least some of thumbnail images for representing user interfaces of the running applications, as in a situation 601-2. The user interface 603 may display a thumbnail image 604 of the user interface 207. The processor 120 may receive an input for changing the display mode of the user interface 207 represented by the thumbnail image 604 while displaying the user interface 603 including the thumbnail image 604. In response to receiving the input for changing the display mode of the user interface 207, the processor 120 may display a menu window 605 including executable objects indicating supportable display modes of the user interface 207, as superimposed on the thumbnail image 604, as in a situation 601-3. The processor 120 may receive an input 606 on an executable object indicating the split screen mode from among the executable objects included in the menu 605, while displaying the menu window 605. In response to receiving the input 606, the processor 120 may identify a height of the user interface 207 to be changed, which will be displayed in the split screen mode. When the height to be changed is a second height 607 that is longer than the reference height, the processor 120 may maintain the expanded bar region 219 as in a situation 601-4. In the situation 601-4, the processor 120 may display another user interface 608 of another application, which is distinct from the application providing the user interface 207, along with the user interface 207. When the height to be changed is a third height 609 that is shorter than or equal to the reference height, the processor 120 may switch the expanded bar region 219 to a regular bar region 205 as in a situation 601-5. In the situation 601-5, the processor 120 may display another user interface 608 of another application, which is distinct from the application providing the user interface 207, along with the user interface 207.

In various embodiments of the disclosure, in response to receiving an input 611 for changing a size of the user interface 207 (or another user interface 608) while displaying another user interface 608 along with the user interface 207 including the expanded bar region 219 in the situation 601-4, the processor 120 may compare a height of the user interface 207 to be changed by the input 611, with the reference height, and, when the height of the user interface 207 to be changed is longer than the reference height, the processor 120 may maintain the expanded bar region 219, and, when the height of the user interface 207 to be changed is shorter than or equal to the reference height, the processor 120 may switch the expanded bar region 219 to the regular bar region 205 as in the situation 601-5.

In various embodiments of the disclosure, in response to receiving an input 613 for changing the size of the user interface 207 (or another user interface 608) while displaying another user interface 608 along with the user interface 207 including the regular bar region 205 in the situation 601-5, the processor 120 may compare a height of the user interface 207 to be changed by the input 613, with the reference height, and, when the height of the user interface 207 to be changed is longer than the reference height, the processor 120 may switch the regular bar region 205 to the expanded bar region 219 as in the situation 601-4, and, when the height of the user interface 207 to be changed is shorter than or equal to the reference height, the processor 120 may maintain the regular bar region 205.

In various embodiments of the disclosure, the processor 120 may switch the expanded bar region to the regular bar region or may maintain the expanded bar region, based on an input for switching the display mode of the user interface including the expanded bar region from the full screen mode to the pop-up screen mode. For example, referring to FIG. 7, the processor 120 may display a user interface 207 including an expanded bar region 219 and a content region 203, along with an indicator region 212, as in a situation 701-1. In the situation 701-1, the user interface 207 may have a first height 702 which is longer than the reference height. While displaying the user interface having the first height 702, the processor 120 may receive an input for switching the display mode of the user interface 207 from the full screen mode to the pop-up screen mode. In response to receiving the input, the processor 120 may identify a height of the user interface 207 to be displayed in the pop-up screen mode. When the identified height is a second height 705 that is shorter than or equal to the reference height, the processor 120 may display a regular bar region 205 which is switched from the expanded bar region 219 within the user interface 207 displayed as superimposed on a home screen 703, as in a situation 701-2. In various embodiments of the disclosure, the regular bar region 205 which is included in the user interface 207 displayed as superimposed on the home screen 703 may have a height shorter than the expanded bar region displayed in the situation 701-1, and may have a width shorter than the expanded bar region displayed in the situation 701-1. When it is identified that the identified height is a third height 707 that is longer than the reference height, the processor 120 may maintain the expanded bar region 219 within the user interface 207 displayed as superimposed on the home screen 703 as in a situation 701-3. In various embodiments of the disclosure, the expanded bar region 219 included in the user interface 207 displayed as superimposed on the home screen 703 may be displayed at a lower magnification than the expanded bar region 219 displayed in the situation 701-1. In various embodiment of the disclosure, the expanded bar region 219 included in the user interface 207 displayed as superimposed on the home screen 703 may have a width that corresponds to a width of the regular bar region 205 displayed in the situation 701-1 and may have a height that is longer than a height of the regular bar region 205 displayed in the situation 701-1.

In various embodiments of the disclosure, in response to detecting release of a drag gesture initiated from the content region while displaying the user interface including the content region and the regular bar region, the processor 120 may identify whether a location of the release of the drag gesture is within a designated region. In various embodiments of the disclosure, the designated region may be configured within the electronic device 101 to identify whether the drag gesture received while the user interface including the content region and the regular bar region is being displayed is an input for scrolling an execution screen displayed within the content region, or an input for switching the regular bar region to the expanded bar region. For example, the designated region may be configured with a lower half region of a display region of the display 140 while the user interface including the content region and the regular bar region is being displayed. However, this should not be considered as limiting. In various embodiments of the disclosure, the processor 120 may switch the regular bar region to the expanded bar region based on identifying that the location of the release of the drag gesture is within the designated region. In various embodiments of the disclosure, the processor 120 may maintain the regular bar region and may scroll the execution screen of the content region in a direction of the drag gesture, based on identifying that the location of the release of the drag gesture is out of the designated region.

In various embodiments of the disclosure, in response to detecting release of a drag gesture initiated from the content region while displaying the user interface including the content region and the expanded bar region, the processor 120 may identify whether a location of the release of the drag gesture is within a designated region. In various embodiments of the disclosure, the designated region may be configured within the electronic device 101 to identify whether the drag gesture received while the user interface including the content region and the expanded bar region is being displayed is an input for scrolling the execution screen displayed within the content region, or an input for switching the expanded bar region to the regular bar region. For example, the designated region may be configured with a higher half region of the display region of the display 140 while the user interface including the content region and the expanded bar region is being displayed. However, this should not be considered as limiting. In various embodiments of the disclosure, the processor 120 may switch the expanded bar region to the regular bar region, based on identifying that the location of the release of the drag gesture is within the designated region. In various embodiments of the disclosure, the processor 120 may maintain the expanded bar region and may scroll the execution screen of the content region in a direction of the drag gesture, based on identifying that the location of the release of the drag gesture is out of the designated region.

For example, referring to FIG. 8, the processor 120 may display a user interface 207 including a regular bar region 205 and a content region 203, along with an indicator region 212, as in a situation 801-1. The processor 120 may receive a drag gesture 803 initiated from the content region 203 while displaying the user interface 207 including the regular bar region 205 and the content region 203. While receiving the drag gesture 803, as in a situation 801-2, the processor 120 may display the regular bar region 205 having a second height, which is longer than a first height of the regular bar region 205 displayed in the situation 801-1, in order to inform that the drag gesture 803 is being received. In various embodiments of the disclosure, the regular bar region 205 having the second height may be distinct from an expanded bar region 219. In various embodiments of the disclosure, the regular bar region 205 having the second height may be displayed only while the drag gesture 803 is being received in order to provide a visual effect for indicating that the drag gesture 803 is being received. In various embodiments of the disclosure, the processor 120 may detect release of the drag gesture 803. In various embodiments of the disclosure, when a location of the release of the drag gesture 803 is a location 805 that is within a designated region, the processor 120 may switch the regular bar region 205 having the second height in the user interface 207 to the expanded bar region 219, as in a situation 801-3. In various embodiments of the disclosure, when the location of the release of the drag gesture 803 is a location 807 that is out of the designated region, the processor 120 may restore the regular bar region 205 having the second height in the user interface 207 to the regular bar region 205 having the first height, and may scroll the execution screen displayed within the content region 203 in the user interface 207, as in a situation 801-4.

In another example, referring to FIG. 9, the processor 120 may display a user interface 207 including an expanded bar region 219 and a content region 203, along with an indicator region 212, as in a situation 901-1. While displaying the user interface 207 including the expanded bar region 219 and the content region 203, the processor 120 may receive a drag gesture 903 initiated from the content region 203. While receiving the drag gesture 903, as in a situation 901-2, the processor 120 may display an expanded bar region 219 having a second height which is shorter than a first height of the expanded bar region 219 displayed in the situation 901-1 (for example, an expanded bar region 219 having the fourth height 307 of FIG. 3), in order to inform that the drag gesture 903 is being received. In various embodiments of the disclosure, the expanded bar region 219 having the second height may be distinct from the regular bar region 205. In various embodiments of the disclosure, the expanded bar region 219 having the second height may be displayed only while the drag gesture 903 is being received, in order to provide a visual effect for indicating that the drag gesture 903 is being received. In various embodiments of the disclosure, the processor 120 may detect release of the drag gesture 903. In various embodiments of the disclosure, when a location of the release of the drag gesture 903 is a location 905 that is within a designated region, the processor 120 may switch the expanded bar region 219 having the second height in the user interface 207 to the regular bar region 219, as in a situation 901-3. In various embodiments of the disclosure, when the location of the release of the drag gesture 803 is a location 907 that is out of the designated region, the processor 120 may restore the expanded bar region 219 having the second height in the user interface 207 to the expanded bar region 219, and may scroll the execution screen displayed within the content region 203 of the user interface 207, as in a situation 901-4.

As described above, an electronic device (for example, the electronic device 101 may include a display (for example, the display 140), a memory (for example, the memory 130) to store instructions, and at least one processor (for example, the processor 120) operably coupled with the memory and the display, and, when executing the instructions, the at least one processor may be configured to display a user interface of an application including a content region and an expanded bar region disposed directly above the content region, and having a first height longer than a reference height, by using the display, while executing the application, receive an input for changing the first height of the user interface being displayed to a second height which is shorter than the reference height, and, based on receiving the input, switch the expanded bar region which is included in the user interface of the application to a regular bar region which has an area smaller than an area of the expanded bar region, by using the display.

In various embodiments of the disclosure, the input may be an input for executing another application which is distinct from the application, along with the application, and, when executing the instructions, the at least one processor may be configured to in response to receiving the input, execute the another application, and, in response to executing the another application, display another user interface of the another application along with the user interface of the application including the regular bar region switched from the expanded bar region, by using the display. In various embodiments of the disclosure, the another user interface of the another application may be displayed directly below or directly above the user interface of the application including the regular bar region switched from the expanded bar region. In various embodiments of the disclosure, when executing the instructions, the at least one processor may be configured to: in response to executing the another application, identify whether a third height of the another user interface of the another application, which is to be displayed with the user interface of the application including the regular bar region switched from the expanded bar region, is longer than the reference height, in response to identifying that the third height is longer than the reference height, display the another user interface of the another application including another content region and another expanded bar region disposed directly above the another content region, along with the user interface of the application including the regular bar region switched from the expanded bar region, by using the display, and, in response to identifying that the third height is shorter than or equal to the reference height, display the another user interface of the another application including the another content region and another regular bar region disposed directly above the another content region, along with the user interface of the application including the regular bar region switching from the expanded bar region, by using the display.

In various embodiments of the disclosure, the input may be an input for switching a display mode of the user interface of the application from a full screen mode to a pop-up screen mode, and, when executing the instructions, the at least one processor may be configured to display, in response to receiving the input, the user interface of the application including the regular bar region switched from the expanded bar region, as superimposed over a home screen, by using the display.

In various embodiments of the disclosure, when executing the instructions, the at least one processor may further be configured to receive another input for changing the first height of the user interface being displayed to the third height which is longer than or equal to the reference height, and, based on receiving the another input, maintain the expanded bar region included in the user interface of the application.

In various embodiments of the disclosure, when executing the instructions, the at least one processor may further be configured to detect release of a drag gesture initiated from the content region, while displaying the user interface including the content region and the expanded bar region, based on identifying that a location of the release of the drag gesture is within a designated region in a display region of the display, switch the expanded bar region included in the user interface of the application to the regular bar region by using the display, and, based on identifying that the location of the release of the drag gesture is out of the designated region in the display region, maintain the expanded bar region included in the user interface of the application.

In various embodiments of the disclosure, when executing the instructions, the at least one processor may further be configured to detect release of a drag gesture initiated from the content region while displaying the user interface including the content region and the regular bar region, based on identifying that a location of the release of the drag gesture is within a designated region in a display region of the display, switch the regular bar region included in the user interface of the application to the expanded bar region by using the display, and, based on identifying that the location of the release of the drag gesture is out of the designated region in the display region, maintain the regular bar region included in the user interface of the application.

In various embodiments of the disclosure, when executing the instructions, the at least one processor may further be configured to in response to receiving the input, identify whether a width of the user interface to be changed by the input is longer than a reference width, in response to identifying that the width is narrower than or equal to the reference width, switch the expanded bar region included in the user interface of the application to the regular bar region by using the display, and, in response to identifying that the width is longer than the reference width, maintain the expanded bar region.

In various embodiments of the disclosure, each of the regular bar region and the expanded bar region may include at least one non-executable object for providing information concerning an execution screen of the application displayed within the content region, and at least one executable object for providing actions concerning the execution screen. In various embodiments of the disclosure, a font size of a text constituting the at least one non-executable object included in the expanded bar region may be larger than a font size of a text constituting the at least one non-executable object included in the regular bar region.

In various embodiments of the disclosure, the at least one non-executable object and the at least one executable object which are included in the regular bar region may be displayed in a single row, and the at least one non-executable object and the at least one executable object which are included in the expanded bar region may be displayed in multiple rows.

In various embodiments of the disclosure, the at least one non-executable object included in the regular bar region, and the at least one non-executable object included in the expanded bar region may include information concerning a title of the application, and the at least one non-executable object included in the expanded bar region may further include summary information of the execution screen, as compared to the at least one non-executable object included in the regular bar region.

In various embodiments of the disclosure, the content region may include a list including a plurality of classifiable contents, and the expanded bar region may further include at least one executable object for classifying the plurality of classifiable contents within the content region according to at least one criterion, as compared to the regular bar region.

In various embodiments of the disclosure, the content region may include a plurality of contents, and the expanded bar region may further include statistical information of the plurality of contents, as compared to the regular bar region.

In various embodiments of the disclosure, the content region may include a plurality of contents, and the expanded bar region may further include information concerning a content having a highest priority from among the plurality of contents, as compared to the regular bar region.

Figure 10:
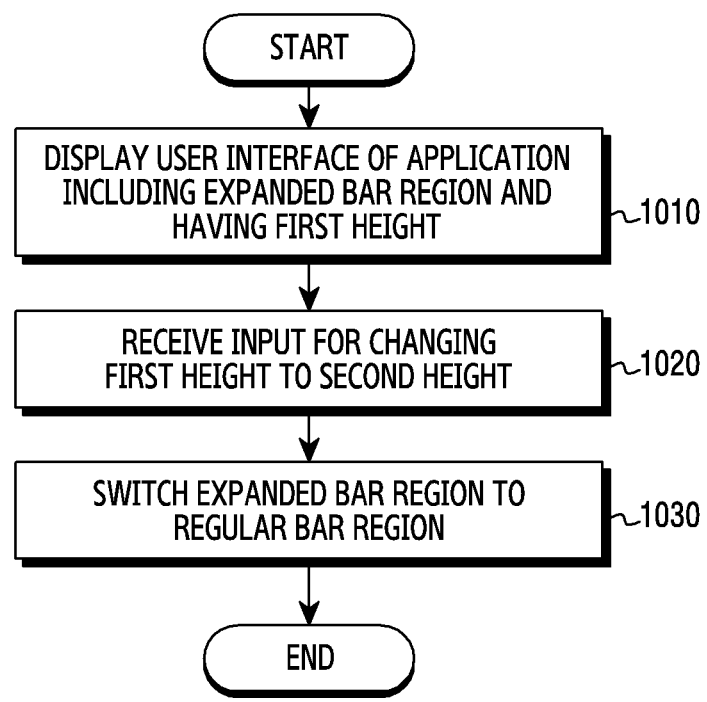
FIG. 10 is a flow diagram illustrating a method for switching a bar region according to an embodiment of the disclosure.

FIG. 10 is a flow diagram illustrating a method for switching a bar region according to an embodiment of the disclosure. This method may be executed by the electronic device 101 shown in FIG. 1 or the processor 120 of the electronic device 101.

Referring to FIG. 10, in operation 1010, the processor 120 may display a user interface of an application including a content region and an expanded bar region and having a first height longer than a reference height, by using the display 140, while executing the application. In various embodiments of the disclosure, the expanded bar region may be display directly above the content region. In various embodiments of the disclosure, the expanded bar region may be displayed directly below the content region.

In various embodiments of the disclosure, the content region may display an execution screen of the application. In various embodiments of the disclosure, the expanded bar region may include at least one non-executable object for providing information concerning the execution screen of the application, and at least one executable object for providing actions concerning the execution screen.

In various embodiments of the disclosure, the reference height may be defined in the electronic device 101 to determine whether to maintain the expanded bar region in the user interface having a changed size of the user interface, or whether to switch the expanded bar region to a regular bar region when the size of the user interface is changed. In various embodiments of the disclosure, the reference height may be changed adaptively according to a type of an application, a type of a content displayed within the execution screen, a type or an attribute of information displayed within the expanded bar region, or a grip state (for example, one-hand grip or both-hand grip) of the electronic device 101. In various embodiments of the disclosure, the reference height may be changed based on user selection.

In operation 1020, the processor 120 may receive an input for changing the first height of the user interface being displayed to a second height which is shorter than the reference height. For example, the input may include an input for changing the user interface displayed in a full screen mode to a split screen mode. For example, the input may include an input for changing the user interface displayed in the full screen mode to a pop-up screen mode. For example, the input may include an input for changing a size of the user interface displayed in the pop-up screen mode. However, this should not be considered as limiting.

In operation 1030, based on receiving the input, the processor 120 may switch the expanded bar region included in the user interface of the application to a regular bar region having an area smaller than an area of the expanded bar region, by using the display 140. For example, the processor 120 may acquire information indicating that the second height is shorter than the reference height by identifying the second height, based on receiving the input, and may switch the expanded bar region to the regular bar region by using the display 140, based on the acquisition.

In various embodiments of the disclosure, in response to acquiring the information indicating that the second height is shorter than the reference height, the processor 120 may identify whether at least one resource for displaying the regular bar region is included in resources provided for displaying the user interface from the application by using a framework installed in the electronic device 101, and, based on identifying that the at least one resource is included in the resources, the processor 120 may switch the expanded bar region to the regular bar region by using the at least one resource.

In various embodiments of the disclosure, in response to acquiring the information indicating that the second height is shorter than the reference height, the processor 120 may invoke the resources provided to display the user interface by using the framework. The processor 120 may acquire at least one resource used to display the expanded bar region from among the invoked resources, and may configure the regular bar region by using the at least one acquired resource. For example, the processor 120 may configure information to be displayed within the regular bar region by using the at least one resource, and may configure arrangement of the information to be displayed. In response to configuring the regular bar region, the processor 120 may switch the expanded bar region to the regular bar region.

In various embodiments of the disclosure, the regular bar region may include at least one non-executable object for providing information concerning the execution screen of the application displayed within the content region, and at least one executable object for providing actions concerning the execution screen.

In various embodiments of the disclosure, a configuration of the regular bar region may be different from a configuration of the expanded bar region at least in part. For example, a font size of a text constituting the at least one non-executable object included in the regular bar region may be smaller than a font size of a text constituting the at least one non-executable object included in the expanded bar region. For example, the at least one non-executable object and the at least one executable object which are included in the regular bar region may be displayed in a single row, whereas the at least one non-executable object and the at least one executable object which are included in the expanded bar region may be displayed in multiple rows.

In various embodiments of the disclosure, the number of supportable services in the regular bar region may be smaller than the number of supportable services in the expanded bar region. For example, compared to the regular bar region, the expanded bar region may further include summary information of the execution screen. For example, when the content region includes a list including a plurality of classifiable contents, the expanded bar region may further include at least one executable object indicating at least one criterion for classifying the plurality of classifiable contents in the content region, compared to the regular bar region. For example, when the content region includes a plurality of contents, the expanded bar region may further include statistical information of the plurality of contents, compared to the regular bar region. For example, when the content region includes a plurality of contents, the expanded bar region may further include information regarding a content having a highest priority from among the plurality of contents, compared to the regular bar region. However, this should not be considered as limiting.

As described above, the electronic device 101 according to various embodiments may determine that a size of the content region corresponding to a main region of the user interface is not guaranteed due to a change in the size of the user interface, based on a height of the user interface to be changed, and may switch the expanded bar region to the regular bar region based on the determination, so that usability can be enhanced. In various embodiment of the disclosure, the electronic device 101 can provide enhanced user experience by enhancing the usability.

Figure 11:
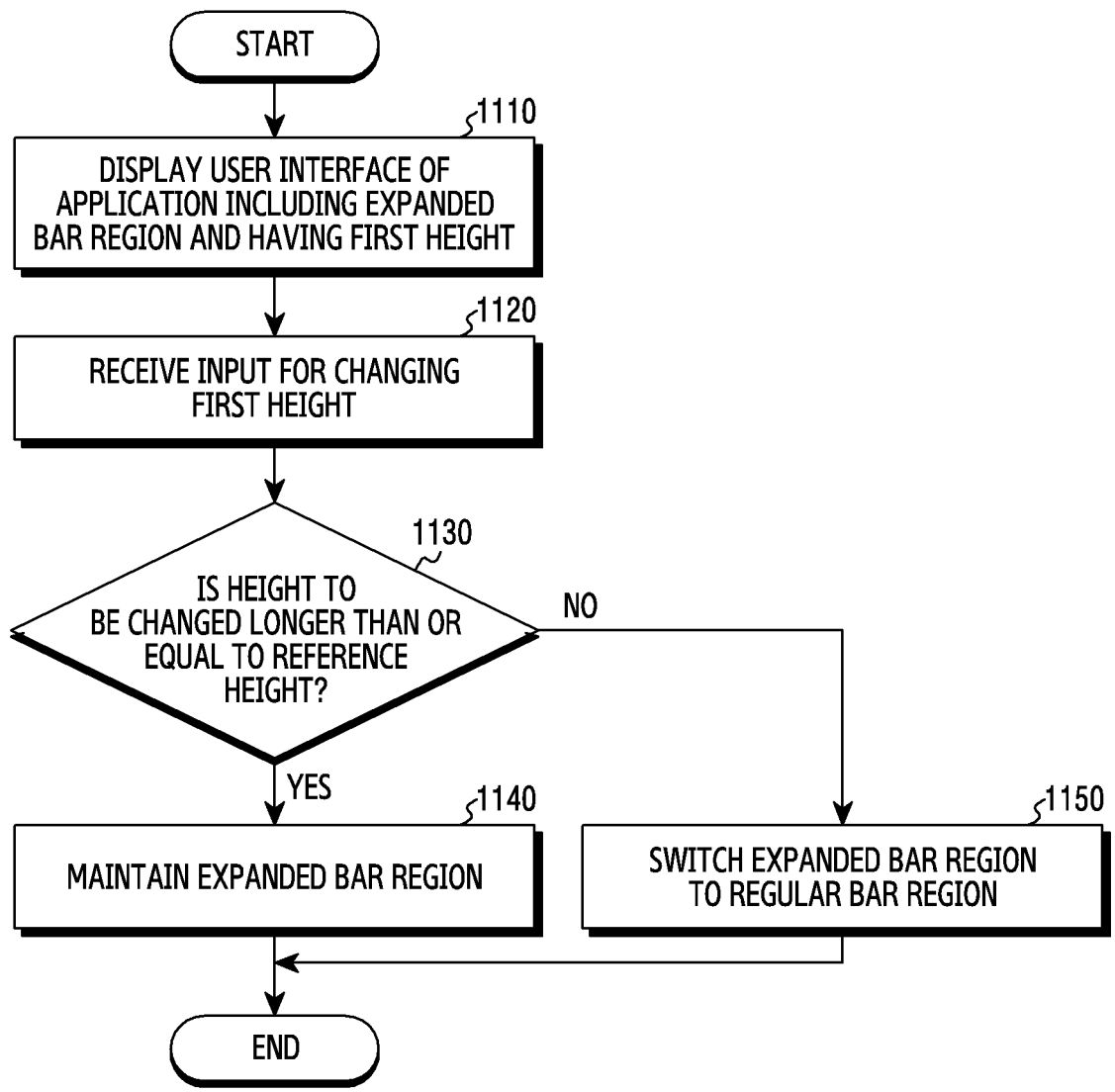
FIG. 11 is a flow diagram illustrating a method for switching or maintaining a bar region according to an embodiment of the disclosure.

FIG. 11 is a flow diagram illustrating a method for switching or maintaining a bar region according to an embodiment of the disclosure. This method may be executed by the electronic device 101 shown in FIG. 1 or the processor 120 of the electronic device 101.

Referring to FIG. 11, in operation 1110, the processor 120 may display a user interface of an application including a content region and an expanded bar region and having a first height longer than a reference height by using the display 140, while executing the application. In various embodiments of the disclosure, operation 1110 may correspond to operation 1010.

In operation 1120, the processor 120 may receive an input for changing the first height of the user interface being displayed. For example, the input may include an input for changing the user interface displayed in a full screen mode to a split screen mode. For example, the input may include an input for changing the user interface displayed in the full screen mode to a pop-up screen mode. For example, the input may include an input for changing a size of the user interface displayed in the pop-up screen mode. However, this should not be considered as limiting.

In operation 1130, the processor 120 may analyze the input in order to identify whether the height to be changed is longer than or equal to the reference height. For example, the processor 120 may identify whether the height to be changed is longer than or equal to the reference height, by analyzing the input, in order to guarantee a size of the content region which displays an execution screen of the application. When the height to be changed is longer than or equal to the reference height, the processor 120 may perform operation 1140. When the height to be changed is shorter than the reference height, the processor 120 may perform operation 1150.

In operation 1140, the processor 120 may maintain the expanded bar region, based on identifying that the height to be changed is longer than or equal to the reference height based on the analyzed input. Since the height to be changed being longer than or equal to the reference height means that the size of the content region is sufficiently guaranteed even if the expanded bar region is maintained, the processor 120 may maintain display of the expanded bar region.

In operation 1150, the processor 120 may switch the expanded bar region to the regular bar region, based on identifying that the height to be changed is shorter than the reference height based on the analyzed input. Since the height to be changed being shorter than the reference height means that the size of the content region is not guaranteed as the display of the expanded bar region is maintained, the processor 120 may switch the expanded bar region to the regular bar region.

As described above, when an event of changing the size of the user interface is detected, the electronic device 101 according to various embodiments may determine whether to provide the expanded bar region or to provide the regular bar region in the user interface, according to whether a space of the content region corresponding to the main region of the user interface is guaranteed, so that enhanced user experience can be provided.

Figure 12:
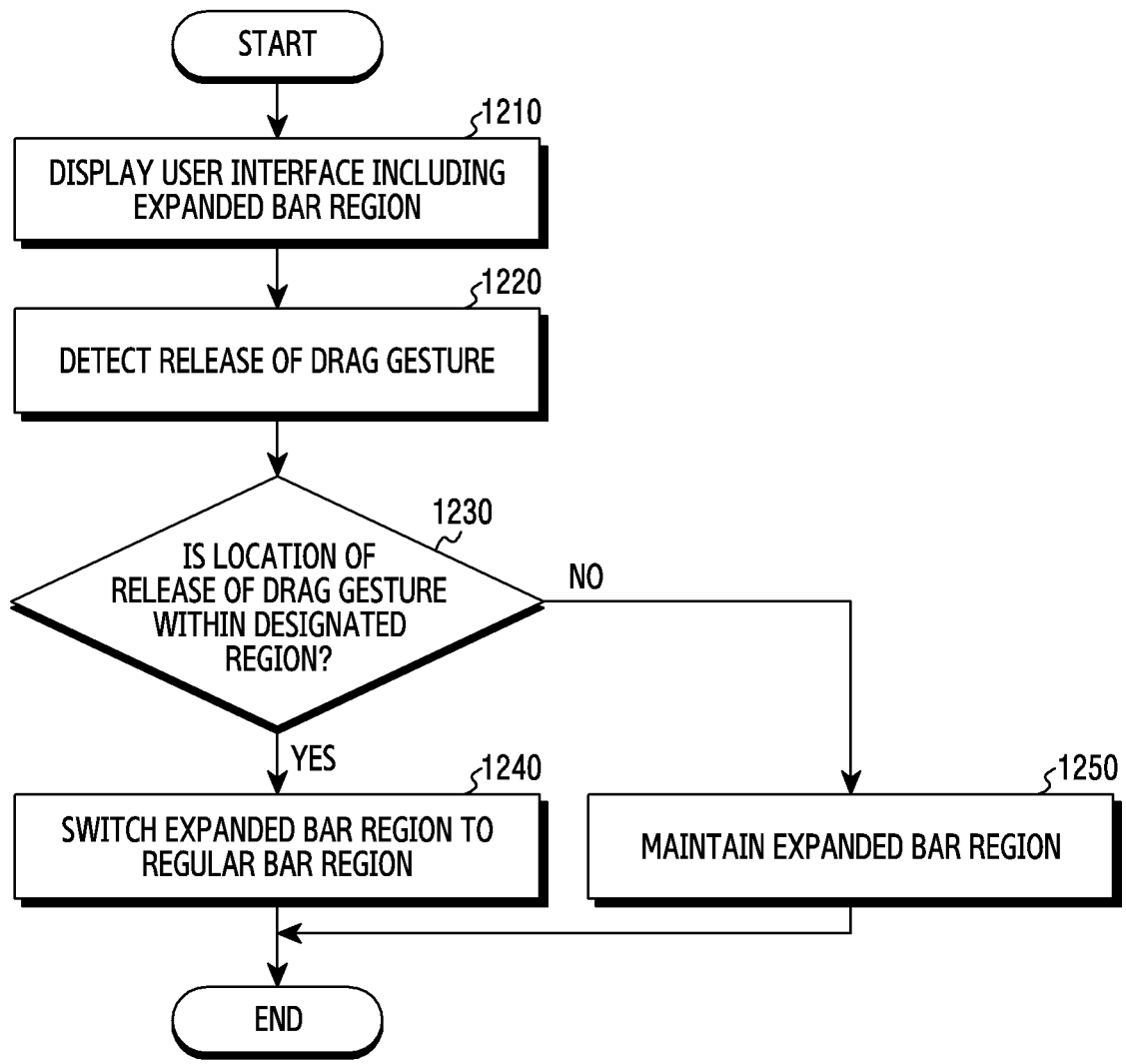
FIG. 12 is a flow diagram illustrating a method for switching or maintaining an expanded bar region based on a location of release of a drag gesture according to an embodiment of the disclosure.

FIG. 12 is a flow diagram illustrating a method for switching or maintaining an expanded bar region based on a location of release of a drag gesture according to an embodiment of the disclosure. This method may be executed by the electronic device 101 shown in FIG. 1 or the processor 120 of the electronic device 101.

Referring to FIG. 12, in operation 1210, the processor 120 may display a user interface of an application including a content region and an expanded bar region and having a first height longer than a reference height by using the display 140, while executing the application. In various embodiments of the disclosure, operation 1210 may correspond to operation 1010.

In operation 1220, the processor 120 may detect release of a drag gesture initiated from the content region, while displaying the content region and the expanded bar region. For example, the processor 120 may identify that the drag gesture is initiated within the content region, by using a touch sensitive surface which is operatively coupled with the display 140 or is included in the display 140, while displaying the content region and the expanded bar region. The processor 120 may identify whether the drag gesture is released while the drag gesture is maintained after being initiated within the content region. The processor 120 may detect the release of the drag gesture based on the identification.

In operation 1230, the processor 120 may identify whether a location of the release of the drag gesture is within a designated region in response to the detection. For example, the processor 120 may analyze the drag gesture to identify whether the location of the release of the drag gesture is within the designated region. In various embodiments of the disclosure, the designated region may be defined within the electronic device 101 to identify whether the drag gesture is to scroll an execution screen of the application displayed within the content region or to switch the expanded bar region to a regular bar region. In various embodiments of the disclosure, a size of the designated region may be changed adaptively according to a type of an application, a type of contents displayed within the execution screen, a type or an attribute of information displayed within the expanded bar region, or a grip state (for example, one-hand grip or both-hand grip) of the electronic device 101. In various embodiments of the disclosure, the size of the designated region may be changed based on user selection.

In various embodiments of the disclosure, when the location of the release of the drag gesture is within the designated region, the processor 120 may perform operation 1240. In various embodiments of the disclosure, when the location of the release of the drag gesture is out of the designated region, the processor 120 may perform operation 1250.

In operation 1240, the processor 120 may switch the expanded bar region to the regular bar region, based on identifying that the location of the release of the drag gesture is within the designated region based on the analysis.

In operation 1250, the processor 120 may maintain the expanded bar region, based on identifying that the location of the release of the drag gesture is out of the designated region based on the analysis.

As described above, the electronic device 101 according to various embodiments can provide enhanced user experience by determining whether to switch the expanded bar region to the regular bar region or whether to maintain the expanded bar region, based on the location of the release of the drag gesture.

Figure 13:
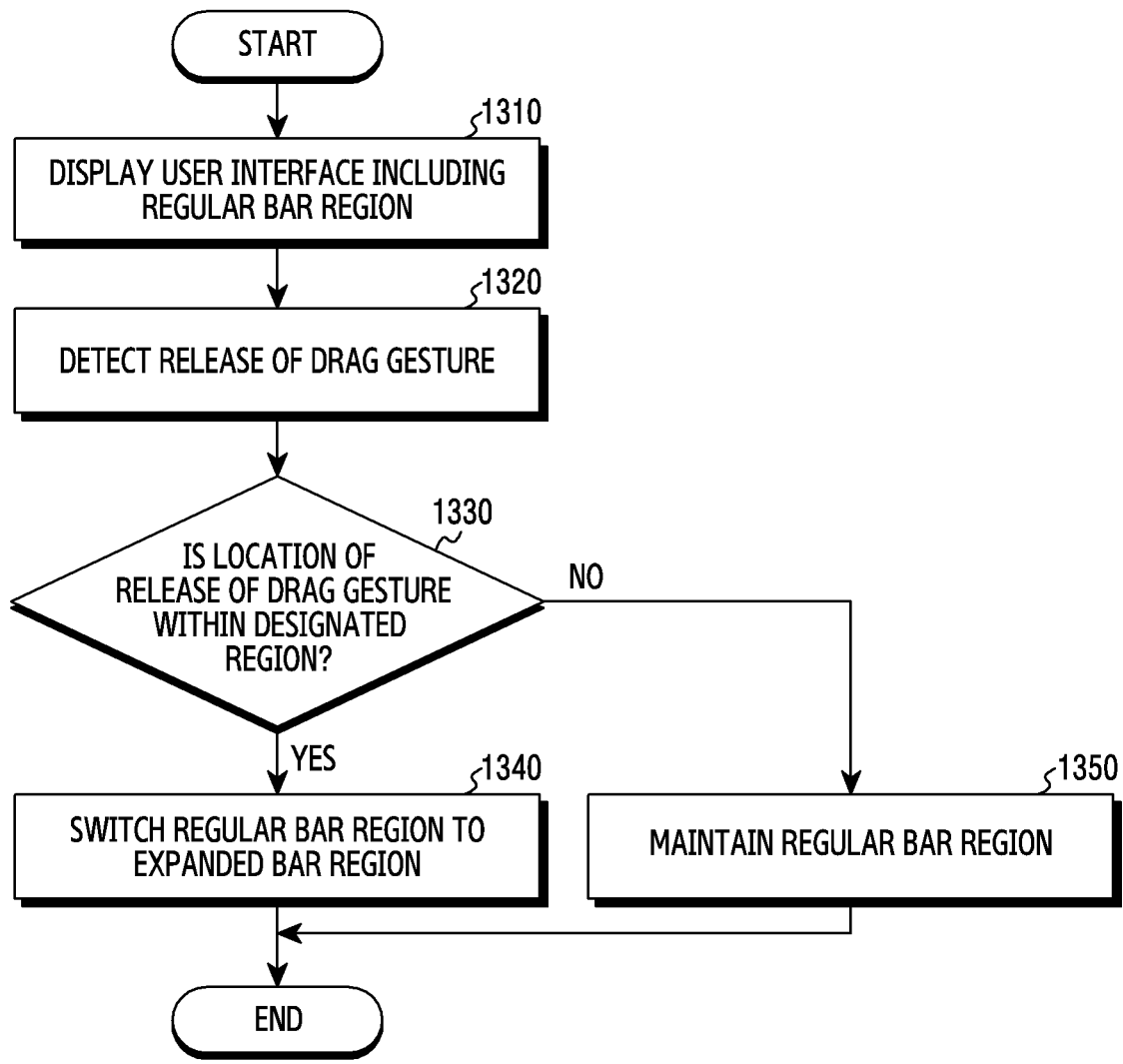
FIG. 13 is a flow diagram illustrating a method for switching or maintaining a regular bar region based on a location of release of a drag gesture according to an embodiment of the disclosure.

FIG. 13 is a flow diagram illustrating a method for switching or maintaining a regular bar region based on a location of release of a drag gesture according to an embodiment of the disclosure. This method may be executed by the electronic device 101 shown in FIG. 1 or the processor 120 of the electronic device 101.

Referring to FIG. 13, in operation 1310, the processor 120 may display a user interface including a content region and a regular bar region.

In operation 1320, the processor 120 may detect release of a drag gesture initiated from the content region, while displaying the user interface including the content region and the regular bar region. For example, the processor 120 may identify that the drag gesture is initiated within the content region by using a touch sensitive surface which is operatively coupled with the display 140 or is included in the display 140, while displaying the content region and the regular bar region. The processor 120 may identify whether the drag gesture is released, while the drag gesture is maintained after being initiated within the content region. The processor 120 may detect release of the drag gesture based on the identification.

In operation 1330, the processor 120 may identify whether a location of the release of the drag gesture is within a designated region in response to the detection. For example, the processor 120 may analyze the drag gesture to identify whether the location of the release of the drag gesture is within the designated region. In various embodiments of the disclosure, the designated region may be defined within the electronic device 101 to identify whether the drag gesture is to scroll an execution screen of the application displayed within the content region, or to switch the expanded bar region to the regular bar region. In various embodiments of the disclosure, a size of the designated region may be changed adaptively according to a type of an application, a type of contents displayed within the execution screen, a type or an attribute of information displayed within the regular bar region, or a grip state (for example, one-hand grip or both-hand grip) of the electronic device 101. In various embodiments of the disclosure, the size of the designated region may be changed based on user selection.

In various embodiments of the disclosure, when the location of the release of the drag gesture is within the designated region, the processor 120 may perform operation 1340. In various embodiments of the disclosure, the processor 120 may perform operation 1350 when the location of the release of the drag gesture is out of the designated region.

In operation 1340, the processor 120 may switch the regular bar region to the expanded bar region, based on identifying that the location of the release of the drag gesture is within the designated region based on the analysis.

In operation 1350, the processor 120 may maintain the regular bar region, based on identifying that the location of the release of the drag gesture is out of the designated region based on the analysis.

As described above, the electronic device 101 according to various embodiments can provide enhanced user experience by determining whether to switch the regular bar region to the expanded bar region or whether to maintain the regular bar region, based on the location of the release of the drag gesture.

Figure 14:
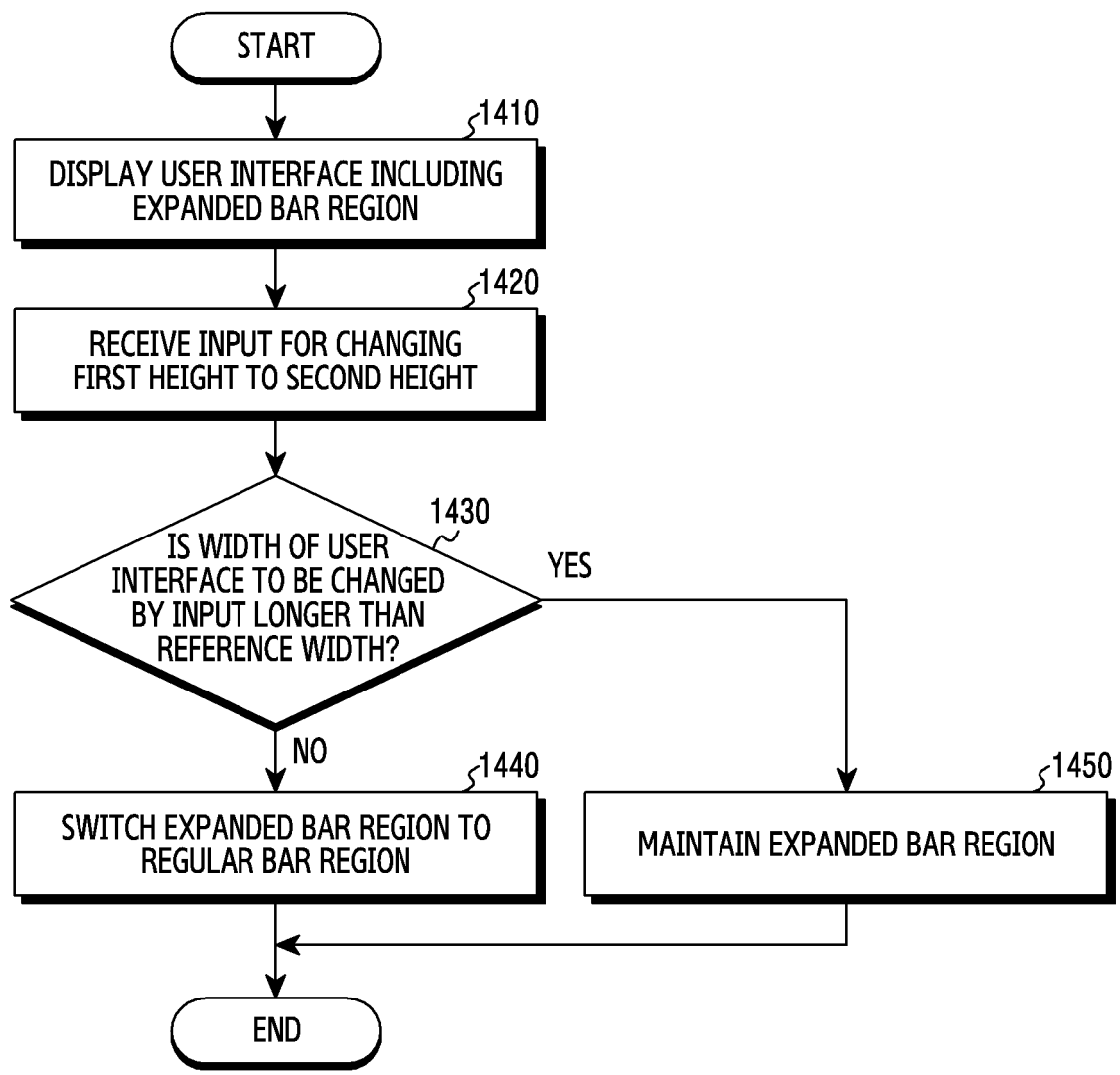
FIG. 14 is a flow diagram illustrating a method for switching or maintaining a bar region based on a height and a width of a user interface to be changed according to an embodiment of the disclosure.

FIG. 14 is a flow diagram illustrating a method for switching or maintaining a bar region, based on a height and a width of a user interface to be changed according to an embodiment of the disclosure. This method may be executed by the electronic device 101 shown in FIG. 1 or the processor 120 of the electronic device 101.

Referring to FIG. 14, in operation 1410, the processor 120 may display a user interface including a content region and an expanded bar region and having a first height longer than a reference height, while executing the application. In various embodiments of the disclosure, operation 1410 may correspond to operation 1010.

In operation 1420, the processor 120 may receive an input for changing the first height of the user interface being displayed to a second height which is shorter than the reference height. In various embodiments of the disclosure, the input may be an input not only for changing the first height of the user interface to the second height, but also for changing a width of the user interface.

In operation 1430, the processor 120 may identify whether a width of the user interface to be changed by the input is longer than a reference width. In various embodiments of the disclosure, since the width of the user interface to be changed is a parameter for determining a size of the content region, with the height of the user interface to be changed, the processor 120 may compare the width of the user interface to be changed with the reference width. In various embodiments of the disclosure, the reference width may be defined within the electronic device 101 to identify whether a space of the content region in the user interface to be changed is sufficiently guaranteed. For example, the processor 120 may analyze the input to identify whether the width of the user interface to be changed is longer than the reference width.

In various embodiments of the disclosure, when the width of the user interface to be changed is shorter than or equal to the reference width, the processor 120 may perform operation 1440. In various embodiments of the disclosure, when the width of the user interface to be changed is longer than the reference width, the processor 120 may perform operation 1450.

In operation 1440, the processor 120 may switch the expanded bar region to the regular bar region, based on identifying that the width of the user interface to be changed is shorter than or equal to the reference width based on the analysis of the input.

In operation 1450, the processor 120 may maintain the expanded bar region, based on identifying that the width of the user interface to be changed is longer than the reference width based on the analysis of the input.

As described above, the electronic device 101 according to various embodiments can provide enhanced user experience by determining whether to provide the expanded bar region or the regular bar region, by considering not only the height of the user interface to be changed but also the width.

As described above, one or more programs stored in at least one non-transitory computer readable storage medium according to various embodiments may include instructions that, when being executed by one or more processors of an electronic device with a display, cause the electronic device to display a user interface of an application program including a content region and an expanded bar region disposed directly above the content region, and having a first height longer than a reference height, by using the display, while executing the application program which is distinct from the one or more programs, receive an input for changing the first height of the user interface being displayed to a second height which is shorter than the reference height, and, based on receiving the input, switch the expanded bar region which is included in the user interface of the application program to a regular bar region which has an area smaller than an area of the expanded bar region, by using the display.

In various embodiments of the disclosure, the input may be an input for executing another application program which is distinct from the one or more programs and the application program, along with the application program, and the one or more programs may include instructions that, when being executed by the one or more processors of the electronic device, cause the electronic device to in response to receiving the input, execute the another application program, and, in response to executing the another application program, display another user interface of the another application program along with the user interface of the application program including the regular bar region switched from the expanded bar region, by using the display. In various embodiments of the disclosure, the another user interface of the another application may be displayed directly below or directly above the user interface of the application including the regular bar region switched from the expanded bar region.

In various embodiments of the disclosure, the one or more programs may include instructions that, when being executed by the one or more processors, cause the electronic device to in response to executing the another application, identify whether a third height of the another user interface of the another application, which is to be displayed with the user interface of the application including the regular bar region switched from the expanded bar region, is longer than the reference height, in response to identifying that the third height is longer than the reference height, display the another user interface of the another application including another content region and another expanded bar region disposed directly above the another content region, along with the user interface of the application including the regular bar region switched from the expanded bar region, by using the display, and, in response to identifying that the third height is shorter than or equal to the reference height, display the another user interface of the another application including the another content region and another regular bar region disposed directly above the another content region, along with the user interface of the application including the regular bar region switching from the expanded bar region, by using the display.

In various embodiments of the disclosure, the input may be an input for switching a display mode of the user interface of the application from a full screen mode to a pop-up screen mode, and the one or more programs may include instructions that, when being executed by the one or more processors, cause the electronic device to display, in response to receiving the input, the user interface of the application including the regular bar region switched from the expanded bar region, as superimposed over a home screen, by using the display.

In various embodiments of the disclosure, the one or more programs may further include instructions that, when being executed by the one or more processors, cause the electronic device to receive another input for changing the first height of the user interface being displayed to the third height which is longer than or equal to the reference height, and, based on receiving the another input, maintain the expanded bar region included in the user interface of the application.

In various embodiments of the disclosure, the one or more programs may further include instructions that, when being executed by the one or more processors, cause the electronic device to detect release of a drag gesture initiated from the content region, while displaying the user interface including the content region and the expanded bar region, based on identifying that a location of the release of the drag gesture is within a designated region in a display region of the display, switch the expanded bar region included in the user interface of the application to the regular bar region by using the display, and, based on identifying that the location of the release of the drag gesture is out of the designated region in the display region, maintain the expanded bar region included in the user interface of the application.

In various embodiments of the disclosure, the one or more programs may further include instructions that, when being executed by the one or more processors, cause the electronic device to detect release of a drag gesture initiated from the content region while displaying the user interface including the content region and the regular bar region, based on identifying that a location of the release of the drag gesture is within a designated region in a display region of the display, switch the regular bar region included in the user interface of the application to the expanded bar region by using the display, and, based on identifying that the location of the release of the drag gesture is out of the designated region in the display region, maintain the regular bar region included in the user interface of the application.

In various embodiments of the disclosure, the one or more programs may further include instructions that, when being executed by the one or more processors, cause the electronic device to in response to receiving the input, identify whether a width of the user interface to be changed by the input is longer than a reference width, in response to identifying that the width is narrower than or equal to the reference width, switch the expanded bar region included in the user interface of the application to the regular bar region by using the display, and, in response to identifying that the width is longer than the reference width, maintain the expanded bar region.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EE-PROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network, such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
a memory configured to store instructions; and
at least one processor operably coupled with the memory and the display,
wherein, when executing the instructions, the at least one processor is configured to:
display a screen comprising an indicator region and a user interface of an application comprising an indicator region, a content region and an expanded bar region disposed between the indicator region and the content region, and having a first height longer than a reference height associated with the application executed by the at least one processor, by using the display, while executing the application,
receive an input for changing the first height of the user interface being displayed to a second height which is shorter than the reference height, and
based on receiving the input, use the display to switch the expanded bar region, included in the user interface of the application, to a regular bar region having an area smaller than an area of the expanded bar region,
wherein the expanded bar region provides at least one of information concerning an execution screen of the application displayed within the content region or at least one executable object for providing actions concerning the execution screen, in a form differently from that provided by the regular bar region, and
wherein the expanded bar region is separate from the content region, the expanded bar region having a height based on at least one of a type of the application displayed within the content region or a type of a content displayed within an execution screen.

2. The electronic device of claim 1,
wherein the input is an input for executing another application which is distinct from the application, along with the application, and
wherein, when executing the instructions, the at least one processor is further configured to:
in response to receiving the input, execute the other application, and
in response to executing the other application, display another user interface of the other application along with the user interface of the application comprising the regular bar region switched from the expanded bar region, by using the display.

3. The electronic device of claim 2, wherein the other user interface of the other application is displayed directly below or directly above the user interface of the application comprising the regular bar region switched from the expanded bar region.

4. The electronic device of claim 2, wherein, when executing the instructions, the at least one processor is further configured to:
in response to executing the other application, identify whether a third height of the other user interface of the other application, which is to be displayed with the user interface of the application comprising the regular bar region switched from the expanded bar region, is longer than the reference height,
in response to identifying that the third height is longer than the reference height, display the other user interface of the other application comprising another content region and another expanded bar region disposed directly above the other content region, along with the user interface of the application comprising the regular bar region switched from the expanded bar region, by using the display, and in response to identifying that the third height is shorter than or equal to the reference height, display the other user interface of the other application comprising the other content region and another regular bar region disposed directly above the other content region, along with the user interface of the application comprising the regular bar region switching from the expanded bar region, by using the display.

5. The electronic device of claim 1,
wherein the input is an input for switching a display mode of the user interface of the application from a full screen mode to a pop-up screen mode, and
wherein, when executing the instructions, the at least one processor is further configured to display, in response to receiving the input, the user interface of the application comprising the regular bar region switched from the expanded bar region, as superimposed over a home screen, by using the display.

6. The electronic device of claim 1, wherein, when executing the instructions, the at least one processor is further configured to:
detect release of a drag gesture initiated from the content region, while displaying the user interface comprising the content region and the expanded bar region,
based on identifying that a location of the release of the drag gesture is within a designated region in a display region of the display, switch the expanded bar region included in the user interface of the application to the regular bar region by using the display, and
based on identifying that the location of the release of the drag gesture is out of the designated region in the display region, maintain the expanded bar region included in the user interface of the application.

7. The electronic device of claim 1, wherein, when executing the instructions, the at least one processor is further configured to:
detect release of a drag gesture initiated from the content region while displaying the user interface comprising the content region and the regular bar region,
based on identifying that a location of the release of the drag gesture is within a designated region in a display region of the display, switch the regular bar region included in the user interface of the application to the expanded bar region by using the display, and
based on identifying that the location of the release of the drag gesture is out of the designated region in the display region, maintain the regular bar region included in the user interface of the application.

8. The electronic device of claim 1, wherein, when executing the instructions, the at least one processor is further configured to:
in response to receiving the input, identify whether a width of the user interface to be changed by the input is longer than a reference width,
in response to identifying that the width is narrower than or equal to the reference width, switch the expanded bar region included in the user interface of the application to the regular bar region by using the display, and
in response to identifying that the width is longer than the reference width, maintain the expanded bar region.

9. The electronic device of claim 1, wherein each of the regular bar region and the expanded bar region comprises at least one non-executable object for providing the information concerning the execution screen of the application displayed within the content region, and the at least one executable object for providing actions concerning the execution screen.

10. The electronic device of claim 9,
wherein the at least one non-executable object and the at least one executable object which are included in the regular bar region are displayed in a single row, and
wherein the at least one non-executable object and the at least one executable object which are included in the expanded bar region are displayed in multiple rows.

11. The electronic device of claim 9,
wherein the at least one non-executable object included in the regular bar region, and the at least one non-executable object included in the expanded bar region comprise information concerning a title of the application, and
wherein the at least one non-executable object included in the expanded bar region further comprises summary information of the execution screen, as compared to the at least one non-executable object included in the regular bar region.

12. The electronic device of claim 1,
wherein the content region comprises a list comprising a plurality of classifiable contents, and
wherein the expanded bar region further comprises at least one executable object for classifying the plurality of classifiable contents within the content region according to at least one criterion, as compared to the regular bar region.

13. The electronic device of claim 1,
wherein the content region comprises a plurality of contents, and
wherein the expanded bar region further comprises statistical information of the plurality of contents, as compared to the regular bar region.

14. At least one non-transitory computer readable storage medium which stores one or more programs, the one or more programs comprising instructions that, when being executed by one or more processors of an electronic device with a display, cause the electronic device to:
display a screen comprising an indicator region and a user interface of an application program comprising a content region and an expanded bar region disposed between the indicator region and the content region, and having a first height longer than a reference height associated with an application executed by the one or more processors of the electronic device, by using the display, while executing the application program which is distinct from the one or more programs,
receive an input for changing the first height of the user interface being displayed to a second height which is shorter than the reference height, and
based on receiving the input, use the display to switch the expanded bar region, included in the user interface of the application program, to a regular bar region having an area smaller than an area of the expanded bar region,
wherein the expanded bar region provides at least one of information concerning an execution screen of the application displayed within the content region or at least one executable object for providing actions concerning the execution screen, in a form differently from that provided by the regular bar region, and
wherein the expanded bar region is separate from the content region, the expanded bar region having a height based on at least one of a type of the application displayed within the content region or a type of a content displayed within an execution screen.

15. A method executed in an electronic device with a display, the method comprising:
   displaying a screen comprising an indicator region and a user interface of an application comprising a content region and an expanded bar region disposed between the indicator region and the content region, and having a first height longer than a reference height associated with the application executed by at least one processor of the electronic device, by using the display, while executing the application within the electronic device;
   receiving an input for changing the first height of the user interface being displayed to a second height which is shorter than the reference height; and
   based on receiving the input, using the display to switch the expanded bar region, included in the user interface of the application, to a regular bar region having an area smaller than an area of the expanded bar region,
   wherein the expanded bar region provides at least one of information concerning an execution screen of the application displayed within the content region or at least one executable object for providing actions concerning the execution screen, in a form differently from that provided by the regular bar region, and
   wherein the expanded bar region is separate from the content region, the expanded bar region having a height based on at least one of a type of the application displayed within the content region or a type of a content displayed within an execution screen.

16. The electronic device of claim 1, wherein the reference height is changed based on at least one of a type of the application, a type of a content displayed within an execution screen, a type of information displayed within the expanded bar region, an attribute of information displayed within the expanded bar region, or a grip state of a user on the electronic device.

17. The electronic device of claim 6, wherein maintaining the expanded bar region included in the user interface of the application further comprises:
   scrolling content displayed in the content region based on the drag gesture.

18. The electronic device of claim 7, wherein maintaining the regular bar region included in the user interface of the application further comprises:
   scrolling content displayed in the content region based on the drag gesture.

* * * * *